(12) United States Patent
Matono

(10) Patent No.: US 7,140,095 B2
(45) Date of Patent: Nov. 28, 2006

(54) METHOD OF MANUFACTURING A THIN FILM MAGNETIC HEAD

(75) Inventor: Naoto Matono, Saku (JP)

(73) Assignee: SAE Magnetics (H.K.) Ltd., Shatin (HK)

( * ) Notice: Subject to any disclaimer, the term of this patent is extended or adjusted under 35 U.S.C. 154(b) by 421 days.

(21) Appl. No.: 10/815,379

(22) Filed: Mar. 31, 2004

(65) Prior Publication Data

US 2004/0218312 A1    Nov. 4, 2004

(30) Foreign Application Priority Data

Mar. 31, 2003    (JP) .............................. 2003-096742

(51) Int. Cl.
   *G11B 5/127*    (2006.01)
(52) U.S. Cl. .............................. 29/603.15; 29/603.08; 29/603.14; 29/603.16; 216/22; 360/317
(58) Field of Classification Search ............. 29/603.07, 29/603.08, 603.09, 603.1, 603.11–603.19; 216/22, 41, 67; 360/121, 122, 317, 318, 360/318.1
   See application file for complete search history.

(56) References Cited

U.S. PATENT DOCUMENTS

| | | | |
|---|---|---|---|
| 5,809,636 A * | 9/1998 | Shouji et al. ............. | 29/603.14 |
| 6,419,845 B1 * | 7/2002 | Sasaki .......................... | 216/22 |
| 6,452,756 B1 * | 9/2002 | Sasaki ......................... | 360/317 |
| 6,524,491 B1 * | 2/2003 | Liu et al. ...................... | 216/22 |
| 6,742,241 B1 * | 6/2004 | Sasaki ...................... | 29/603.07 |
| 7,067,066 B1 * | 6/2006 | Sasaki et al. ................. | 216/22 |

* cited by examiner

*Primary Examiner*—Peter Vo
(74) *Attorney, Agent, or Firm*—Kenyon & Kenyon LLP

(57) ABSTRACT

The present invention provides a method of manufacturing a thin film magnetic head, capable of easily manufacturing a thin film magnetic head with high precision, in which a magnetic shield layer is disposed so as to surround a magnetic pole layer from three directions of a medium outflow direction and two side directions. In a magnetic pole formation region surrounded by a first gap layer portion, a magnetic pole layer and a second gap layer portion are formed and the magnetic pole layer is covered with the first and second gap layer portions. After that, a write shield layer is formed on the first and second gap layer portions so as to surround the magnetic pole layer from three directions (a trailing direction and two side directions). Since a gap between the magnetic layer and the write shield layer exerting an influence on recording characteristics is specified on the basis of the thickness of the first gap layer portion, different from the case where the gap is specified on the basis of pattern precision of the photolithography technique, the gap is controlled with high precision.

11 Claims, 28 Drawing Sheets

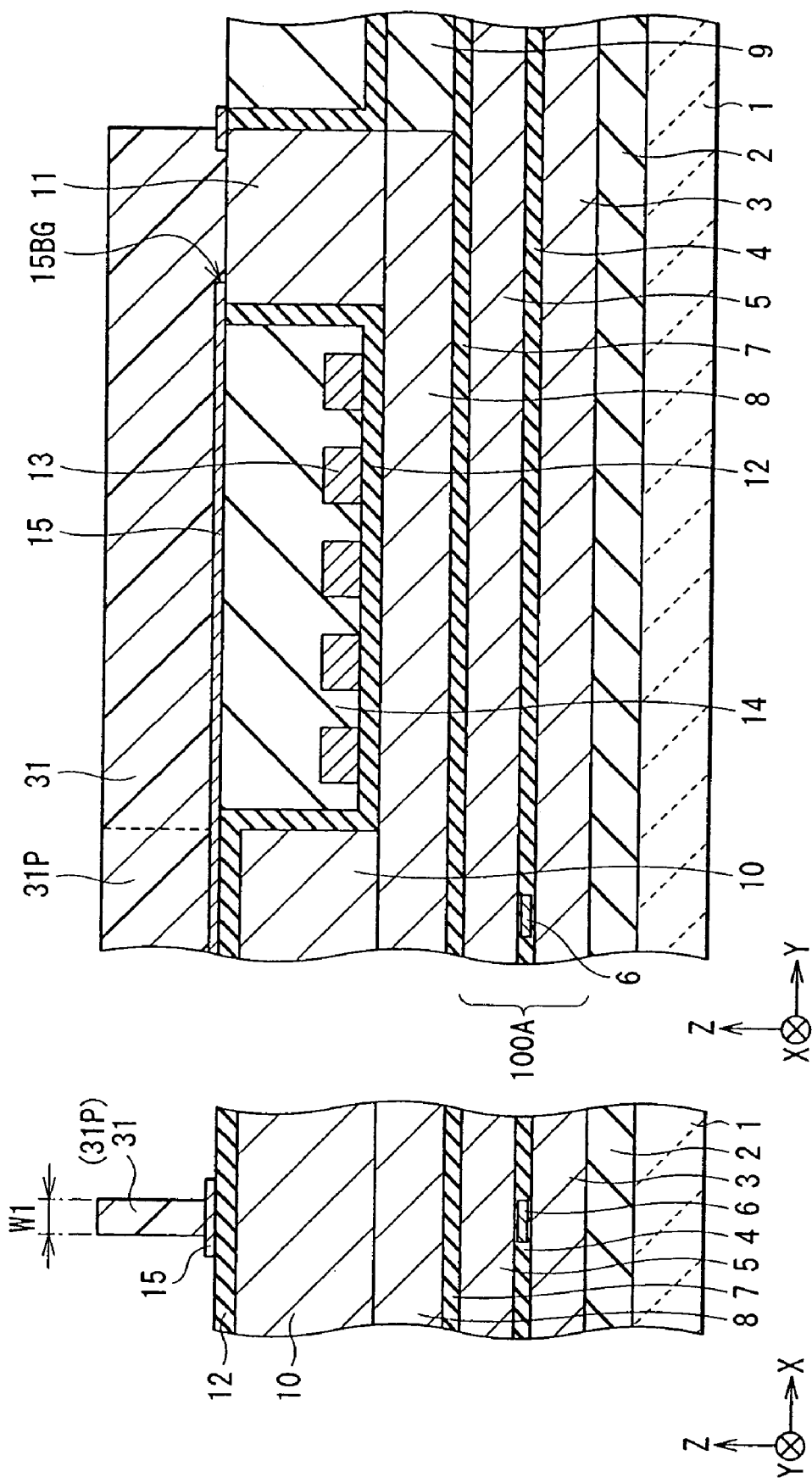

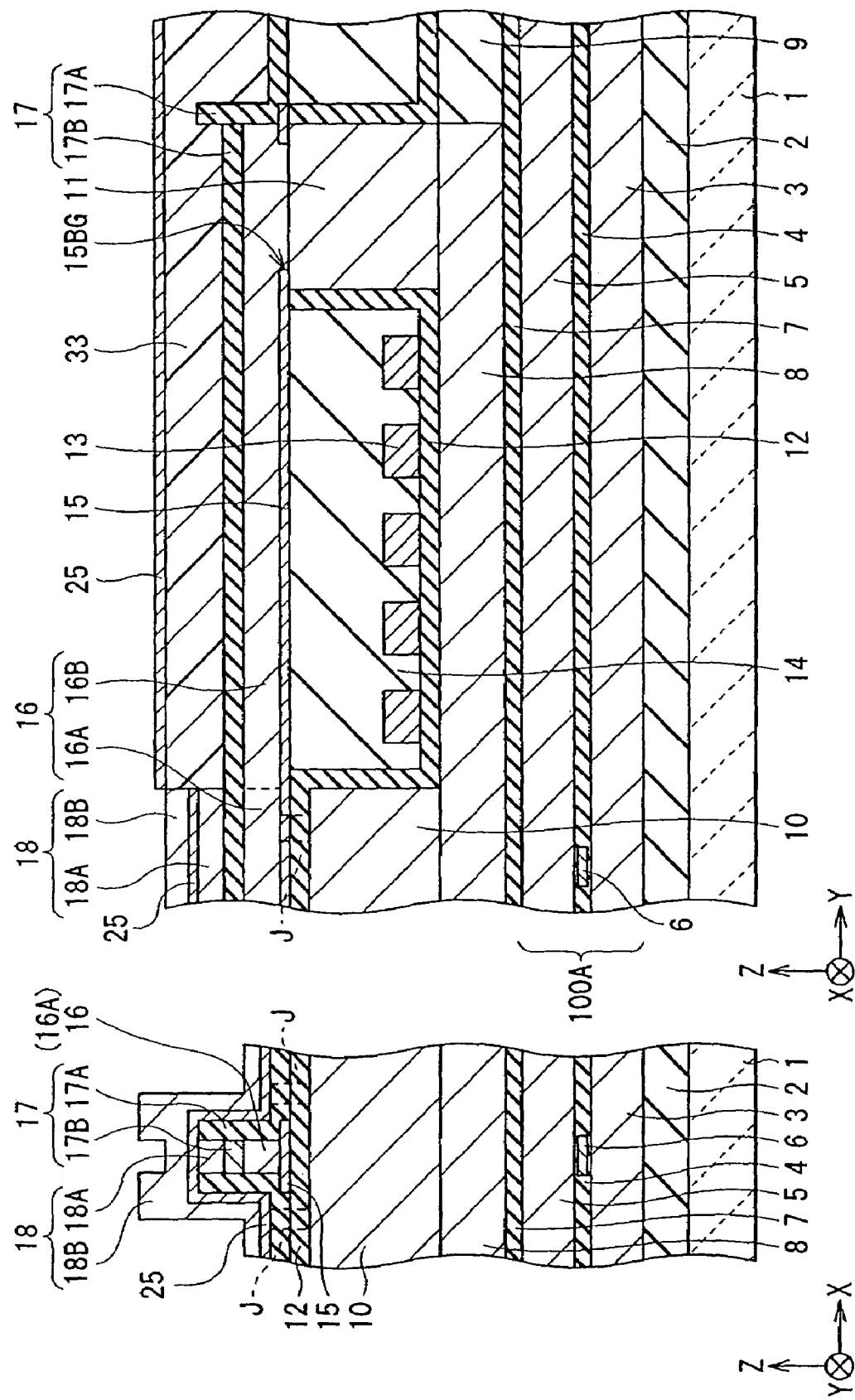

METHOD OF MANUFACTURING A THIN FILM MAGNETIC HEAD

BACKGROUND OF THE INVENTION

1. Field of the Invention

The present invention relates to a thin film magnetic head having at least an inductive magnetic transducer for recording and a method of manufacturing the same. More particularly, the invention relates to a thin film magnetic head having a write shield layer for preventing spread of a magnetic flux emitted from a magnetic pole layer and a method of manufacturing the same.

2. Description of the Related Art

In recent years, improvement in performance of a thin film magnetic head is demanded with improvement in areal density of a magnetic recording medium (hereinbelow, simply called "recording medium") such as a hard disk. Examples of a known method of recording a thin film magnetic head are a longitudinal recording method in which the orientation of a signal magnetic field is set to an in-plane direction (longitudinal direction) of a recording medium and a perpendicular recording method in which the orientation of a signal magnetic field is set to a direction orthogonal to the face of a recording medium. At present, the longitudinal recording method is widely used. However, when a market trend accompanying improvement in areal density is considered, it is assumed that, in place of the longitudinal recording method, the perpendicular recording method will be regarded as a promising method in future for the following reason. The perpendicular recording method has advantages such that high linear recording density can be assured and a recorded recording medium is not easily influenced by thermal fluctuations.

A thin film magnetic head of the perpendicular recording method has, for example, a thin film coil for generating a magnetic flux, a magnetic pole layer for emitting the magnetic flux generated by the thin film coil toward a recording medium, and a write shield layer (magnetic shield layer) for preventing spread of a magnetic flux emitted from the magnetic pole layer. As a thin film magnetic head of this kind, a thin film magnetic head in which a write shield layer is disposed on a trailing side of the magnetic pole layer (medium outflow side) is known (for example, refer to Japanese Unexamined Patent Application Nos. 05-325137 and 06-236526). Another example of the known methods is a method of disposing a write shield layer so as to surround a magnetic pole layer from three directions of a trailing direction and two side directions which are orthogonal to the trailing direction in order to effectively prevent spread of a magnetic flux (refer to, for example, U.S. Pat. No. 4,656,546). The thin film magnetic heads have an advantage of improved recording density since a recording track width on a recording medium is narrowed on the basis of prevention of spread of a magnetic flux.

To spread a thin film magnetic head of the perpendicular recording method, it is necessary to facilitate the manufacturing process as much as possible in consideration of mass production. Although the conventional thin film magnetic head in which the write shield layer is disposed so as to surround the magnetic pole layer from the three directions of the trailing direction and the two side directions is very excellent from the viewpoint of prevention of spread of a magnetic flux, the head has problems such that the process of manufacturing the thin film magnetic head is difficult and the processing precision in manufacture is insufficient. Consequently, at the time of manufacturing the thin film magnetic head of this kind, it is desired to establish an easy, high-precision manufacturing process.

SUMMARY OF THE INVENTION

The present invention has been achieved in consideration of such problems and its first object is to provide a method capable of easily manufacturing a thin film magnetic head at high precision, in which a magnetic shield layer is disposed so as to surround a magnetic pole layer from three directions of a medium outflow direction and two side directions orthogonal to the medium outflow direction.

A second object of the invention is to provide a thin film magnetic head manufactured by using the method of manufacturing a thin film magnetic head of the invention.

A method of manufacturing a thin film magnetic head according to a first aspect of the invention, comprising a thin film coil for generating a magnetic flux and a magnetic pole layer having a magnetic pole tip portion for emitting the magnetic flux generated by the thin film coil toward a recording medium traveling in a predetermined medium travel direction, comprises: a first step of forming a first photoresist layer in a pattern so as to have a shape in plan view corresponding to a shape in plan view of the magnetic pole layer; a second step of forming a first gap layer so as to cover the first photoresist layer and a peripheral region of the first photoresist layer; a third step of forming a second photoresist layer so as to cover the first gap layer; a fourth step of exposing the first photoresist layer by etching at least the second photoresist layer and the first gap layer halfway; a fifth step of removing the first and second photoresist layers to thereby form a magnetic pole formation region surrounded by the first gap layer in a region from which the first photoresist layer is removed; a sixth step of forming the magnetic pole layer in a pattern in the magnetic pole formation region so as to extend from a recording medium facing surface which faces the recording medium in the direction away from the recording medium facing surface; a seventh step of forming a second gap layer in a pattern on the magnetic pole layer to thereby surround the magnetic pole layer from three directions of a medium outflow direction in the medium travel direction and two side directions orthogonal to the medium outflow direction by the first and second gap layers; and an eighth step of forming a magnetic shield layer in a pattern on the first and second gap layers so as to extend from the recording medium facing surface in the direction away from the recording medium facing surface and to surround the magnetic pole tip portion of the magnetic pole layer from the three directions.

In the method of manufacturing a thin film magnetic head according to the first aspect of the invention, in a magnetic pole formation region surrounded by a first gap layer, a magnetic pole layer and a second gap layer are formed, and the magnetic pole layer is covered with the first and second gap layers from three directions. After that, a magnetic shield layer is formed on the first and second gap layer portions so as to surround the magnetic pole tip portion of the magnetic pole layer from three directions.

A method of manufacturing a thin film magnetic head according to a second aspect of the invention, comprising a thin film coil for generating a magnetic flux and a magnetic pole layer having a magnetic pole tip portion for emitting the magnetic flux generated by the thin film coil toward a recording medium traveling in a predetermined medium travel direction, comprises: a first step of forming a first photoresist layer in a pattern so as to have a shape in plan view corresponding to a shape in plan view of the magnetic pole tip portion; a second step of forming a first gap layer so as to cover the first photoresist layer and a peripheral region of the first photoresist layer; a third step of forming a second photoresist layer so as to cover the first gap layer; a fourth step of exposing the first photoresist layer by etching at least the second photoresist layer and the first gap layer halfway; a fifth step of removing the first and second photoresist layers to thereby form a magnetic pole tip formation region surrounded by the first gap layer in a region from which the first photoresist layer is removed; a sixth step of forming the magnetic pole tip portion in a pattern in the magnetic pole tip formation region so as to extend from a recording medium facing surface which faces the recording medium in the direction away from the recording medium facing surface; a seventh step of forming a second gap layer in a pattern on the magnetic pole tip portion to thereby surround the magnetic pole tip portion from three directions of a medium outflow direction in the medium travel direction and two side directions orthogonal to the medium outflow direction by the first and second gap layers; and an eighth step of forming a magnetic shield layer in a pattern on the first and second gap layers so as to extend from the recording medium facing surface in the direction away from the recording medium facing surface and to surround the magnetic pole tip portion from the three directions.

In the method of manufacturing a thin film magnetic head according to the second aspect of the invention, in a magnetic pole tip formation region surrounded by a first gap layer, a magnetic pole tip portion and a second gap layer are formed, and the magnetic pole tip portion is surrounded from three directions by the first and second gap layers. After that, a magnetic shield layer is formed on the first and second gap layer portions so as to surround the magnetic pole tip portion from three directions.

A thin film magnetic head according to the first aspect of the invention comprises: a thin film coil for generating a magnetic flux; a magnetic pole layer having a magnetic pole tip portion for emitting the magnetic flux generated by the thin film coil toward a recording medium traveling in a predetermined medium travel direction, and extending from a recording medium facing surface which faces the recording medium in the direction away from the recording medium facing surface; a first gap layer disposed so as to be adjacent to the magnetic pole layer in two side directions orthogonal to the medium outflow direction in the medium travel direction; a second gap layer disposed so as to be adjacent to the magnetic pole layer in the medium outflow direction; and a magnetic shield layer disposed so as to extend from the recording medium facing surface in the direction away from the recording medium facing surface and so as to surround the magnetic pole tip portion of the magnetic pole layer from three directions of the medium outflow direction and the two side directions via the first and second gap layers.

The thin film magnetic head according to the first aspect of the invention has: the first gap layer adjacent to the magnetic pole layer in two side directions; the second gap layer disposed adjacent to the magnetic pole layer in the medium outflow direction; and the magnetic shield layer surrounding the magnetic pole tip portion of the magnetic pole layer from three directions of the medium outflow direction and the two side directions via the first and second gap layers. Thus, the thin film magnetic head can be manufactured by using the method of manufacturing a thin film magnetic head according to the first aspect of the invention.

A thin film magnetic head according to the second aspect of the invention comprises: a thin film coil for generating a magnetic flux; a magnetic pole layer having a magnetic pole tip portion for emitting the magnetic flux generated by the thin film coil toward a recording medium traveling in a predetermined medium travel direction, and extending from a recording medium facing surface which faces the recording medium in a direction away from the recording medium facing surface; a first gap layer disposed so as to be adjacent to the magnetic pole tip portion in two side directions orthogonal to the medium outflow direction in the medium travel direction; a second gap layer disposed so as to be adjacent to the magnetic pole tip portion in the medium outflow direction; and a magnetic shield layer disposed so as to extend from the recording medium facing surface in the direction away from the recording medium facing surface and so as to surround the magnetic pole tip portion from three directions of the medium outflow direction and the two side directions via the first and second gap layers.

The thin film magnetic head according to the second aspect of the invention has: the first gap layer adjacent to the magnetic pole tip portion in two side directions; the second gap layer adjacent to the magnetic pole tip portion in the medium outflow direction; and the magnetic shield layer surrounding the magnetic pole tip portion from three directions of the medium outflow direction and the two side directions via the first and second gap layers. Thus, the thin film magnetic head can be manufactured by using the method of manufacturing a thin film magnetic head according to the second aspect of the invention.

Other and further objects, features and advantages of the invention will appear more fully from the following description.

BRIEF DESCRIPTION OF THE DRAWINGS

FIGS. 6A and 6B are cross sections showing a process subsequent to FIGS. 5A and 5B.

FIGS. 28A and 28B are cross sections for explaining one of forming processes of a second modification of the method of forming the write shield layer.

DETAILED DESCRIPTION OF THE PREFERRED EMBODIMENTS

Embodiments of the invention will now be described in detail hereinbelow with reference to the drawings.

Figures 1A, 1B:
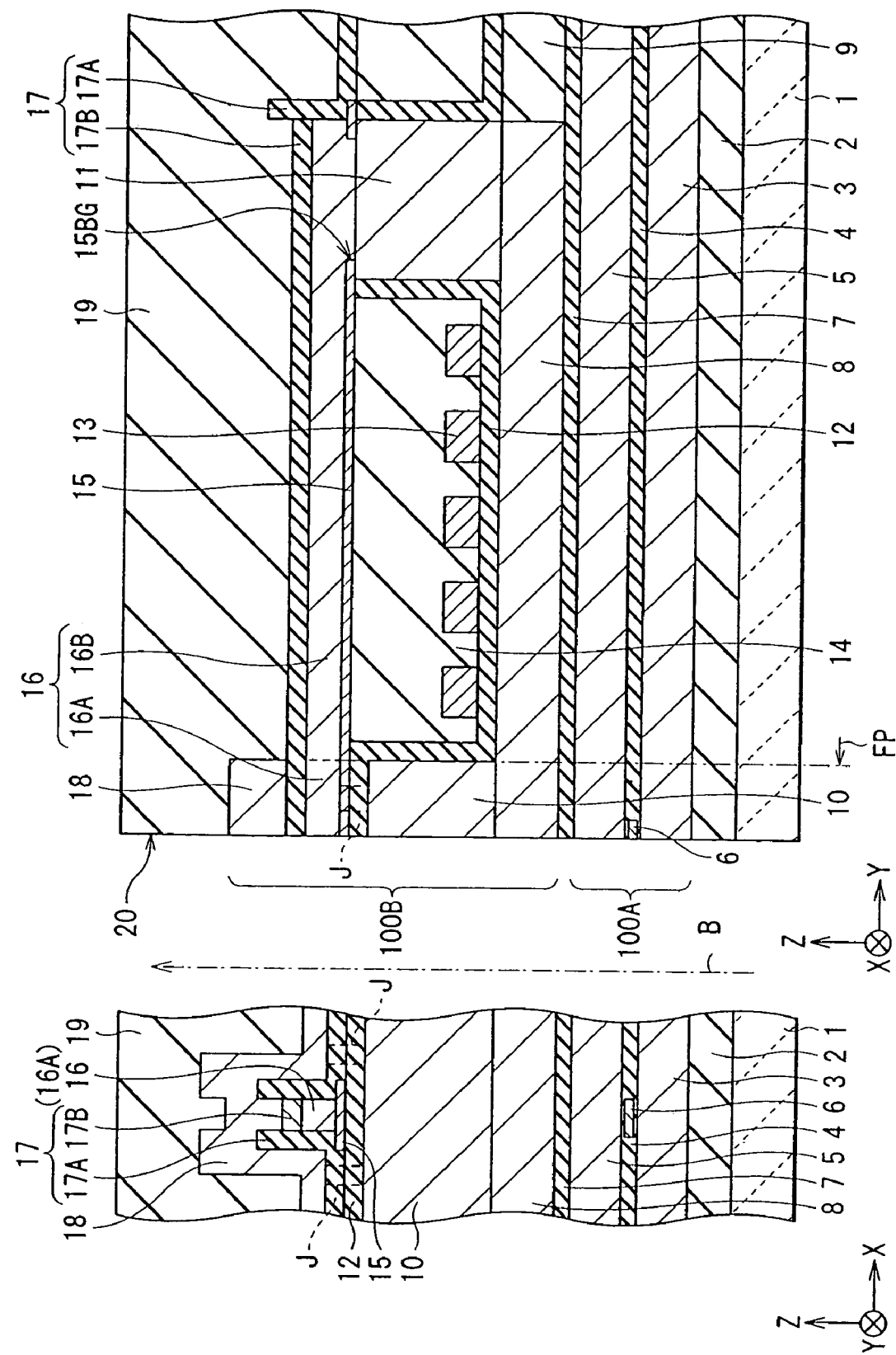
FIGS. 1A and 1B are cross sections showing a sectional configuration of a thin film magnetic head according to an embodiment of the invention.
Figure 2:
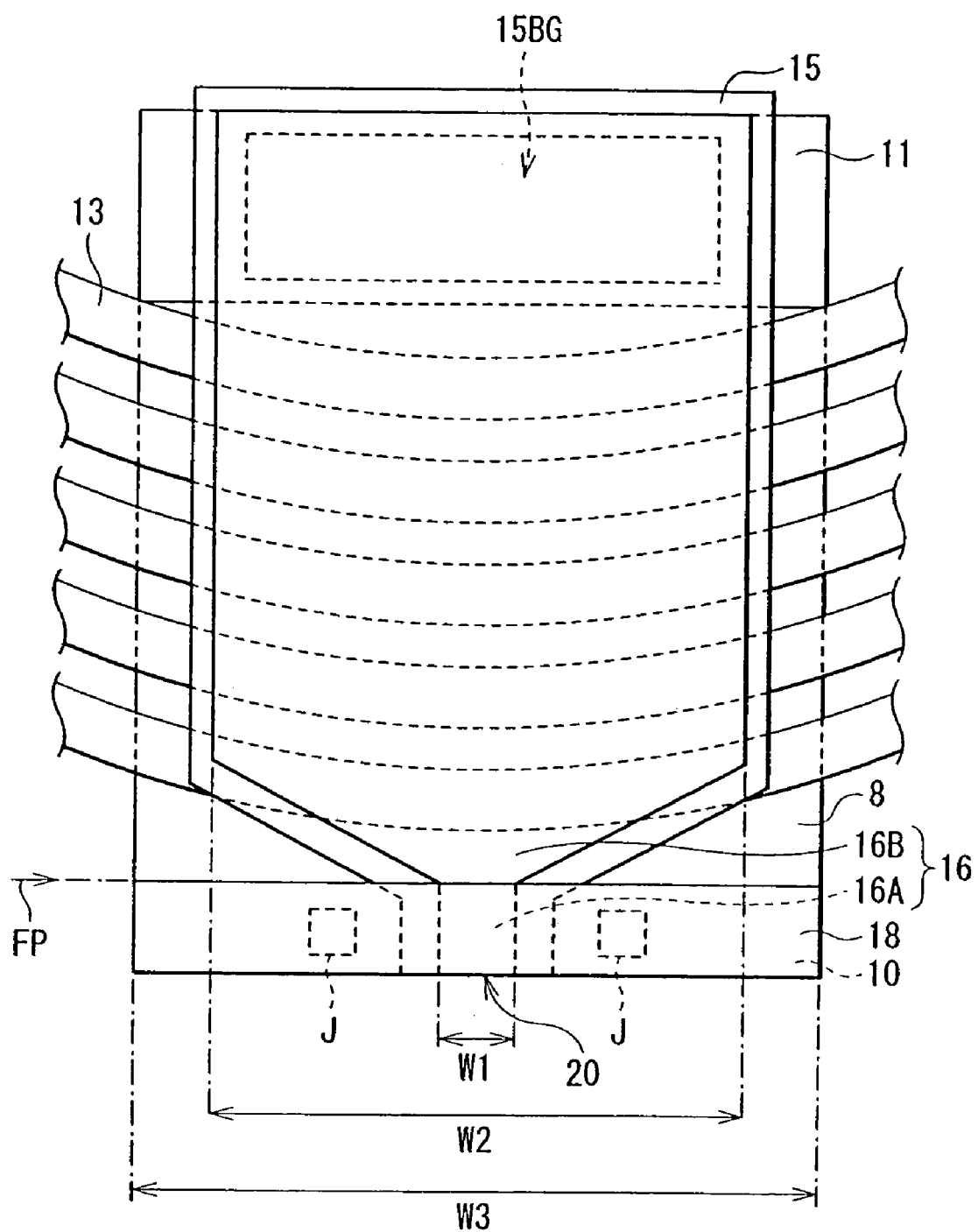
FIG. 2 is a plan view showing the configuration of main components of the thin film magnetic head illustrated in FIGS. 1A and 1B.
Figure 3:
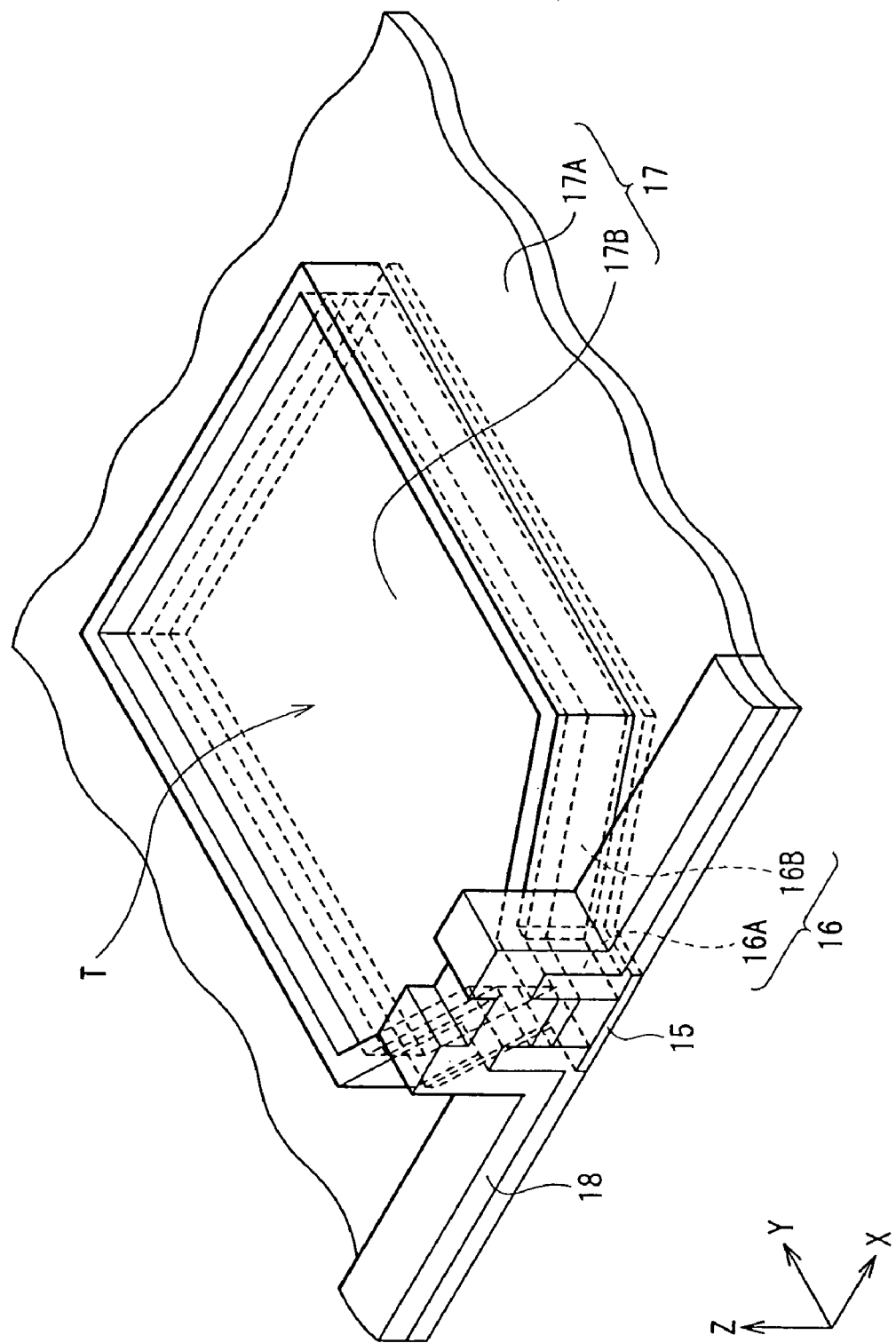
FIG. 3 is a perspective view showing the configuration of main components of the thin film magnetic head illustrated in FIGS. 1A and 1B.

First, the configuration of a thin film magnetic head according to an embodiment of the invention will be described with reference to FIGS. 1A and 1B to FIG. 3. FIGS. 1A and 1B show sectional configurations of a thin film magnetic head. FIG. 1A shows a section parallel to an air bearing surface 20 and FIG. 1B shows a section perpendicular to the air bearing surface 20. FIG. 2 is a plan view showing the configuration of main components of the thin film magnetic head illustrated in FIGS. 1A and 1B. FIG. 3 is a perspective view showing the configuration of the main components. An upward arrow B shown in FIGS. 1A and 1B indicates the travel direction of a recording medium (not shown) relative to the thin film magnetic head (medium travel direction).

In the following description, the distance in the X-axis direction shown in FIGS. 1A and 1B to FIG. 3 will be described as "width", the distance in the Y-axis direction will be described as "length", and the distance in the Z-axis direction will be described as "thickness, height, or depth". The side closer to the air bearing surface 20 in the Y-axis direction will be described as "front side or forward" and the side opposite to the front side will be described as "rear side or rearward". The description will be similarly used in FIGS. 4A and 4B and subsequent drawings.

The thin film magnetic head is, for example, a composite head capable of executing the functions of both recording and reproducing. As shown in FIGS. 1A and 1B, the thin film magnetic head has a configuration obtained by stacking, on a substrate 1 made of a ceramic material such as AlTiC ($Al_2O_3 \cdot TiC$), an insulating layer 2 made of a non-magnetic insulating material such as aluminum oxide ($Al_2O_3$, hereinbelow, simply called "alumina"), a reproducing head portion 100A for executing a reproducing process by using a magneto-resistive (MR) effect, an isolation layer 7 made of a non-magnetic insulating material such as alumina, a recording head portion 100B of a single magnetic pole type for executing a recording process of a perpendicular recording method, and an overcoat layer 19 made of a non-magnetic insulating material such as alumina. The layers are stacked in this order.

The reproducing head portion 100A has, for example, a configuration in which a lower shield layer 3, a shield gap film 4, and an upper shield layer 5 are stacked in this order. In the shield gap film 4, an MR device 6 as a reproducing device is buried so that one end face is exposed in the recording medium facing surface (air bearing surface) 20 which faces a recording medium.

The lower and upper shield layers 3 and 5 are made of, for example, a magnetic material such as a nickel iron alloy (NiFe (for example, Ni: 80% by weight and Fe: 20% by weight) which will be simply called "permalloy (trademark)" hereinbelow). Each of the layers has a thickness of about 1.0 µm to 2.0 µm. The shield gap film 4 is used to electrically isolate the MR device 6 from the periphery and is made of, for example, a non-magnetic insulating material such as alumina. The MR device 6 is provided to execute a reproducing process by using GMR (Giant Magneto-resistive) or TMR (Tunneling Magneto-resistive) effect.

The recording head portion 100B has a configuration obtained by, for example, sequentially stacking a return yoke layer 8 buried by an insulating layer 9, an auxiliary return yoke layer 10, a yoke layer 11, and a thin film coil 13 buried by insulating layers 12 and 14, a seed layer 15 having an opening (back gap 15BG) for connection, a magnetic pole layer 16 covered with a gap layer 17, and a write shield layer (magnetic shield layer) 18. FIG. 2 shows the return yoke layer 8, auxiliary return yoke layer 10, yoke layer 11, thin film coil 13, seed layer 15, magnetic pole layer 16, and write shield layer 18 in the recording head portion 100B. FIG. 3 shows the seed layer 15, magnetic pole layer 16, gap layer 17, and write shield layer 18.

The return yoke layer 8 is provided to return a magnetic flux emitted from the magnetic pole layer 16 and magnetized a recording medium and is made of, for example, a magnetic material such as permalloy or an iron cobalt nickel (FeCoNi) alloy. The return yoke layer 8 extends in the direction apart from the air bearing surface 20 and has, for example, a rectangular shape (having a width W3) in plan view. The auxiliary return yoke layer 10 is provided to lead the magnetic flux used for recording to the return yoke layer 8, is exposed from the air bearing surface 20 and connected to the return yoke layer 8. The yoke layer 11 is provided to connect the return yoke layer 8 and the magnetic pole layer 16, recessed from the air bearing surface 20 and connected to the return yoke layer 8. Each of the auxiliary return yoke layer 10 and the yoke layer 11 is made of, for example, a magnetic material as that of the return yoke layer 8 and has a rectangular shape (having the width W3) in plan view. "Connection" in the specification means not only a simple contact but also a contact and magnetic conduction. The insulating layer 9 is made of, for example, a non-magnetic insulating material such as alumina.

The thin film coil 13 is provided to generate a magnetic flux for recording. The thin film coil 13 has, for example, a winding structure that a wire is wound in a spiral shape around the yoke layer 11 as a center, and is made of a high-conductive material such as copper (Cu). In each of FIGS. 1A, 1B and FIG. 2, only a part of a plurality of turns constructing the thin film coil 13 is shown. The insulating layers 12 and 14 are provided to electrically isolate the thin film coil 13 from the periphery and are made of, for example, a non-magnetic insulating material such as alumina.

The seed layer 15 is used for performing a plating process and has, for example, a shape in plan view corresponding to the shape in plan view of the magnetic pole layer 16.

The magnetic pole layer 16 is provided to contain the magnetic flux generated by the thin film coil 13 and emit the magnetic flux toward a recording medium, and extends from the air bearing surface 20 in the direction apart from the air bearing surface 20. The magnetic pole layer 16 includes, for example, a tip portion 16A (magnetic pole tip portion) extending from the air bearing surface 20 in the direction apart from the air bearing surface 20 and having a uniform width W1 (=about 0.15 µm) specifying the recording track width, and a rear end portion 16B connected to the rear end of the tip portion 16A and having a width W2 larger than the width W1 of the tip portion 16A (W2>W1). The rear end portion 16B has the uniform width W2 in its rear part and is gradually tapered to the tip portion 16A. The position from which the width of the magnetic pole layer 16 increases from the tip portion 16A (width W1) to the rear end portion 16B (width W2) is called a flare point FP.

The gap layer 17 is provided to construct a gap for providing magnetic isolation between the magnetic layer 16 and the write shield layer 18. The gap layer 17 includes a gap layer portion 17A (first gap layer) which is disposed so as to cover the side faces and a peripheral area of the magnetic layer 16 and is adjacent to the magnetic pole layer 16, and a gap layer portion 17B (second gap layer) disposed so as to cover the top face of the magnetic pole layer 16 and is adjacent to the magnetic pole layer 16. The level of the top face of the gap layer portion 17A is, for example, higher than that of the gap layer portion 17B.

The write shield layer 18 is provided to contain a spread portion of the magnetic flux emitted from the magnetic pole layer 16 and to prevent the spread of the magnetic flux. For example, the write shield layer 18 extends from the air bearing surface 20 to the flare point FP and surrounds the tip portion 16A of the magnetic layer 16 from the three directions. The three directions denotes a trailing direction (medium outflow direction) with respect to the position in which the magnetic pole layer 16 is disposed as a reference and two side directions orthogonal to the trailing direction (herein-below, also simply called "three directions"). The "trailing direction" is a direction of outflow of a recording medium when a moving state of the recording medium traveling in the medium travel direction B (refer to FIGS. 1A and 1B) is regarded as a flow. In this case, the trailing direction is an upward direction in the thickness direction (Z-axis direction). The direction of inflow is called a "leading direction (medium inflow direction)" and is a downward direction in the thickness direction. The "two side directions" denote both directions in width (rightward and leftward directions in the X-axis direction). The write shield layer 18 is connected to the auxiliary return yoke layer 10 via two connection holes J provided so as to penetrate both of the insulating layer 12 and the gap layer portion 17A. The write shield layer 18 has a rectangular shape (having the width W3) in plan view. The number of the connection holes J and the positions of the connection holes J can be arbitrarily set.

The operation of the thin film magnetic head will now be described with reference to FIGS. 1A and 1B and FIG. 2.

In the thin film magnetic head, at the time of recording information, when a current flows into the thin film coil 13 of the recording head portion 100B via a not-shown external circuit, a magnetic flux is generated by the thin film coil 13. The magnetic flux generated at this time is contained by the magnetic pole layer 16 and flows from the rear end portion 16B to the tip portion 16A in the magnetic pole layer 16. Since the magnetic flux flowing in the magnetic pole layer 16 is converged at the flare point FP as the width of the magnetic pole layer 16 decreases, the magnetic flux is concentrated in the trailing side portion of the tip portion 16A. When the magnetic flux is emitted from the tip portion 16A to the outside, a recording magnetic field is generated in the direction orthogonal to the surface of a recording medium and the recording medium is magnetized in the perpendicular direction by the recording magnetic field, thereby magnetically recording information onto the recording medium. The spread component of the magnetic flux emitted from the tip portion 16A is contained by the write shield layer 18, so that the spread of the magnetic flux is prevented. The magnetic flux contained by the write shield layer 18 flows into the auxiliary return yoke layer 10 via the connection holes J and further flows into the return yoke layer 8. The magnetic flux which has magnetized the recording medium is returned to the return yoke layer 8 via the auxiliary return yoke layer 10.

At the time of reproducing, when a sense current flows into the MR device 6 in the reproducing head portion 100A, the resistance value of the MR device 6 changes according to a signal magnetic field for reproducing from the recording medium. Since the resistance change is detected as a change in the sense current, the information recorded on the recording medium is magnetically read.

Figure 19:
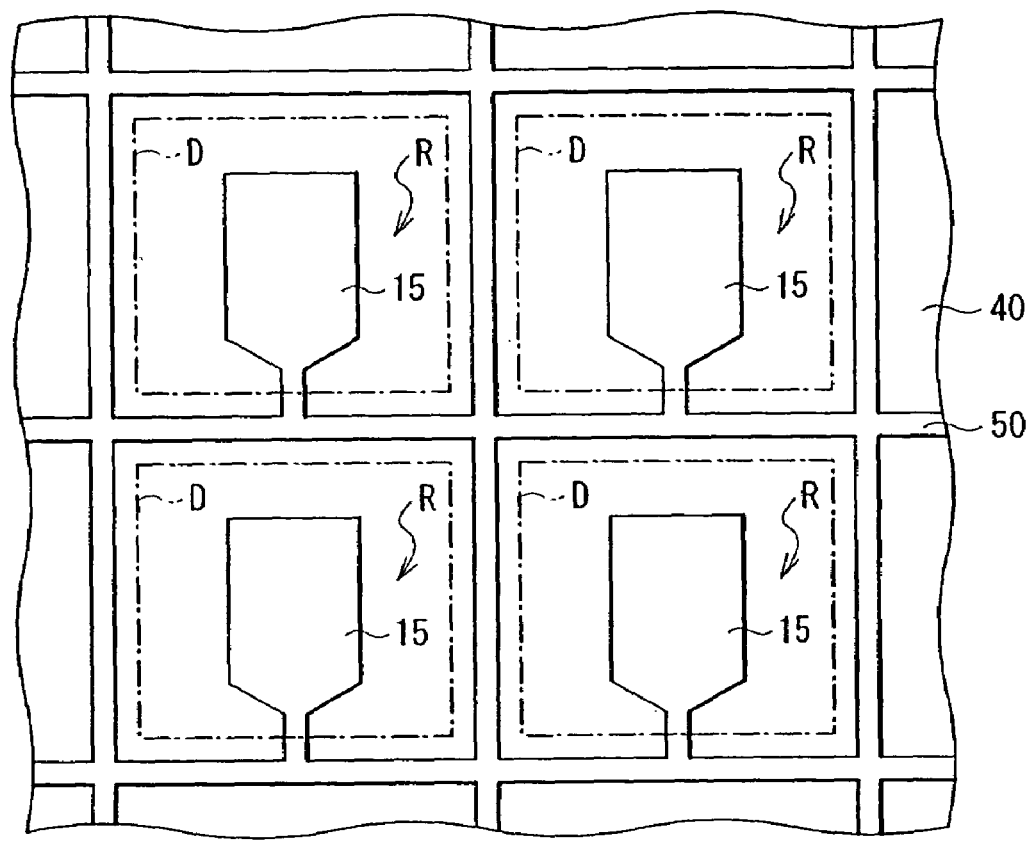
FIG. 19 is a plan view showing the configuration for explaining an example of formation of a seed layer.
Figure 20:
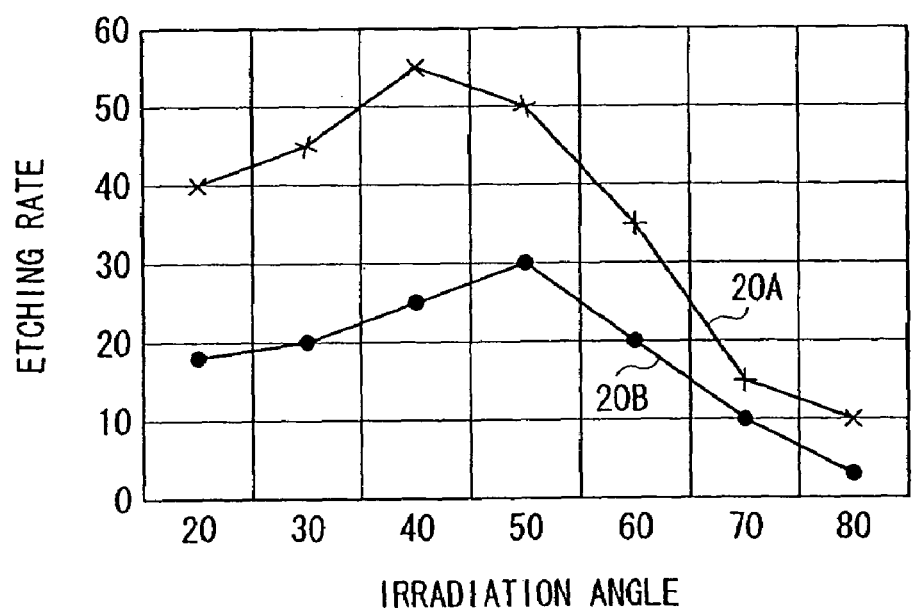
FIG. 20 is a diagram showing dependency on an incident angle of etching rate.

A method of manufacturing the thin film magnetic head shown in FIGS. 1A and 1B to FIG. 3 will now be described with reference to FIGS. 4A and 4B to FIG. 20. FIGS. 4A and 4B to FIG. 18 are diagrams for explaining processes of manufacturing the thin film magnetic head. FIGS. 4A and 4B to FIGS. 11A and 11B show sectional configurations corresponding to FIGS. 1A and 1B. FIGS. 12 to 18 are plan views showing configurations corresponding to FIGS. 5A and 5B to FIGS. 11A and 11B, respectively. FIG. 19 is a plan view showing the configuration for explaining an example of formation of the seed layer 15. FIG. 20 shows dependency on an incident angle of an etching rate. The lateral axis of FIG. 20 denotes the incident angle θ (°) of an ion beam and the vertical axis indicates the etching rate (nm/minute).

"20A" indicates an etching rate to a photoresist, and "20B" indicates an etching rate to alumina.

In the following, first, an outline of processes of manufacturing a whole thin film magnetic head will be described. After that, processes of forming main components (the magnetic pole layer 16, gap layer 17, and write shield layer 18) of the recording head portion 100B to which the method of manufacturing the thin film magnetic head of the invention is applied will be described in detail. Description of the materials, dimensions, structural features, and the like of the series of the components of the thin film magnetic head which have been already described in detail will not be repeated.

A plurality of thin film magnetic heads are manufactured in a lump by, for example, sequentially forming components in parallel in a plurality of positions on a wafer and stacking the components by mainly using a thin film process including a film forming technique such as plating and sputtering, a patterning technique such as photolithography technique, and an etching technique such as dry etching. Specifically, first, the insulating layer 2 is formed on the substrate 1 and, after that, the lower shield layer 3, the shield gap film 4 in which the MR device 6 is buried, and the upper shield layer 5 are stacked on the insulating layer 2 in accordance with this order, thereby forming the reproducing head portion 100A. Subsequently, the isolation layer 7 is formed on the reproducing head portion 100A. On the isolation layer 7, by sequentially stacking the return yoke layer 8 buried by the insulating layer 9, the auxiliary return yoke layer 10, yoke layer 11 and thin film coil 13 buried by the insulating layers 12 and 14, seed layer 15, magnetic pole layer 16 covered with the gap layer 17, and write shield layer 18, the recording head portion 100B is formed. Finally, the overcoat layer 19 is formed on the recording head portion 100B and, after that, the air bearing surface 20 is formed by using mechanical process and polishing process, thereby completing the thin film magnetic head.

Figure 4B:
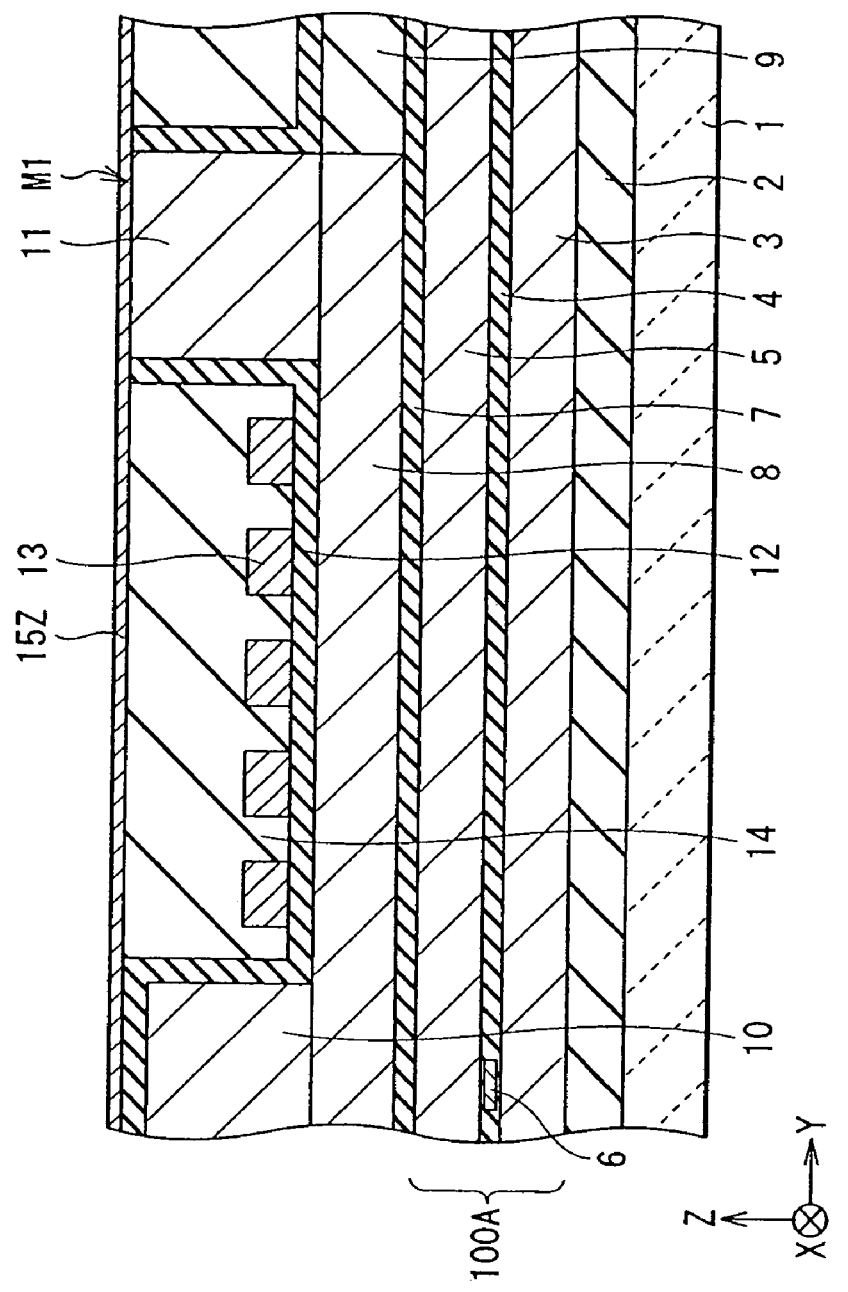
FIGS. 4A and 4B are cross sections for explaining one of processes of manufacturing the thin film magnetic head shown in FIGS. 1A and 1B to FIG. 3.
Figure 4A:
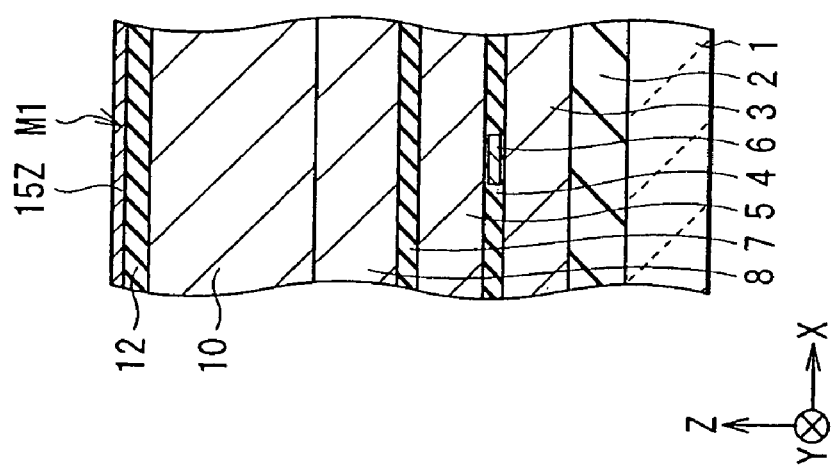

At the time of forming the main components of the recording head portion 100B, the insulating layers 12 and 14 are formed so as to bury the auxiliary return yoke layer 10, yoke layer 11, and thin film coil 13, and a flat surface M1 is constructed by the insulating layers 12 and 14 and the yoke layer 11. After that, first, as shown in FIGS. 4A and 4B, a precursor seed layer 15Z made of a magnetic material such as permalloy or a metal material such as copper is formed to a thickness of about 0.01 μm to 0.1 μm on the flat surface M1 by using sputtering or the like.

Figures 5A, 5B:
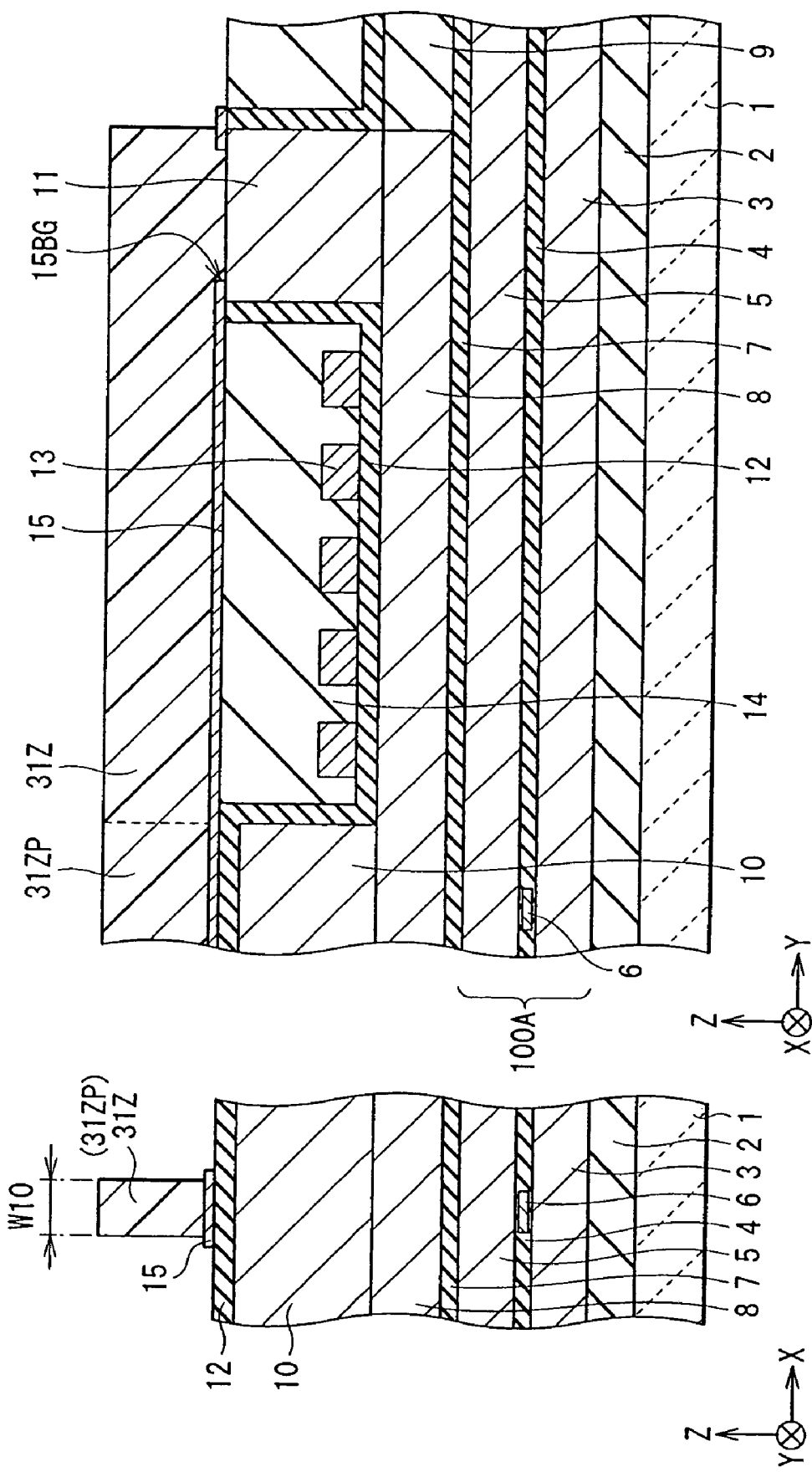
FIGS. 5A and 5B are cross sections showing a process subsequent to FIGS. 4A and 4B.
Figure 12:
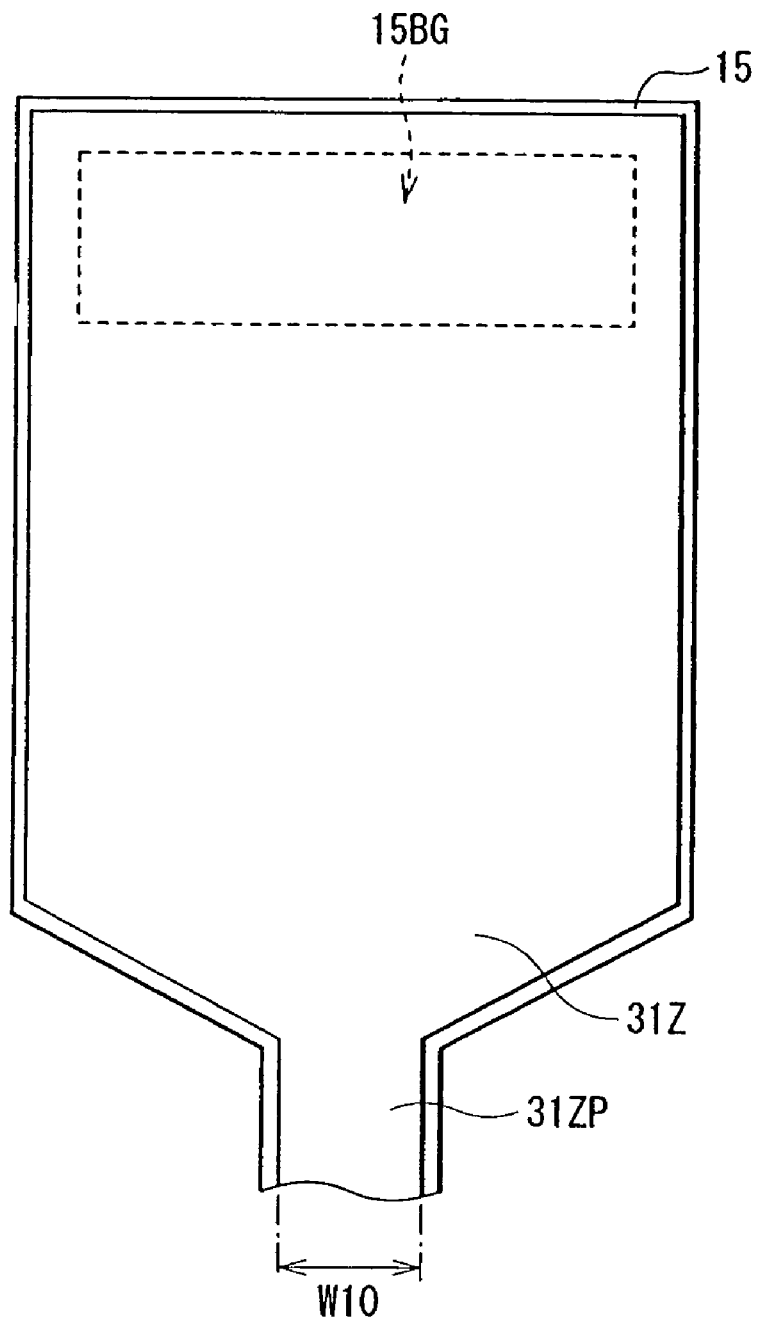
FIG. 12 is a plan view showing the configuration corresponding to the sectional configuration illustrated in FIGS. 5A and 5B.

Subsequently, by using, for example, ion milling, the precursor seed layer 15Z is etched and patterned, thereby forming the seed layer 15 in a pattern as shown in FIGS. 5A and 5B and FIG. 12. The seed layer 15 is formed so that, for example, its outline becomes larger than the outline of the magnetic pole layer 16 to be formed in a post process. By selectively removing a region in which the yoke layer 11 and the magnetic pole layer 16 are connected in a post process in the precursor seed layer 15Z, the back gap 15BG is formed in the seed layer 15.

In particular, at the time of forming the seed layer 15, as described above, considering that a plurality of thin film magnetic heads are formed in parallel on the wafer, for example, as shown in FIG. 19, preferably, by patterning the precursor seed layer 15Z, a lead layer 50 for energization is patterned together with the seed layer 15 on a wafer 40, and the seed layer 15 is disposed for each region (thin film magnetic head formation region) R surrounded by the lead layer 50, and each seed layer 15 is connected to the lead layer 50. Closing lines D in FIG. 19 express portions to be diced in the wafer 40 after completion of the thin film magnetic heads.

Subsequently, a photoresist is applied on the seed layer 15 and patterned by using the photolithography technique, thereby forming a precursor photoresist layer 31Z in a pattern as shown in FIGS. 5A and 5B and FIG. 12. At the time of forming the precursor photoresist layer 31Z, for example, a portion (corresponding portion) 31ZP having a width W10 larger than the width W1 (W10>W1) of the tip portion 16A of the magnetic pole layer 16 is included.

Figure 13:
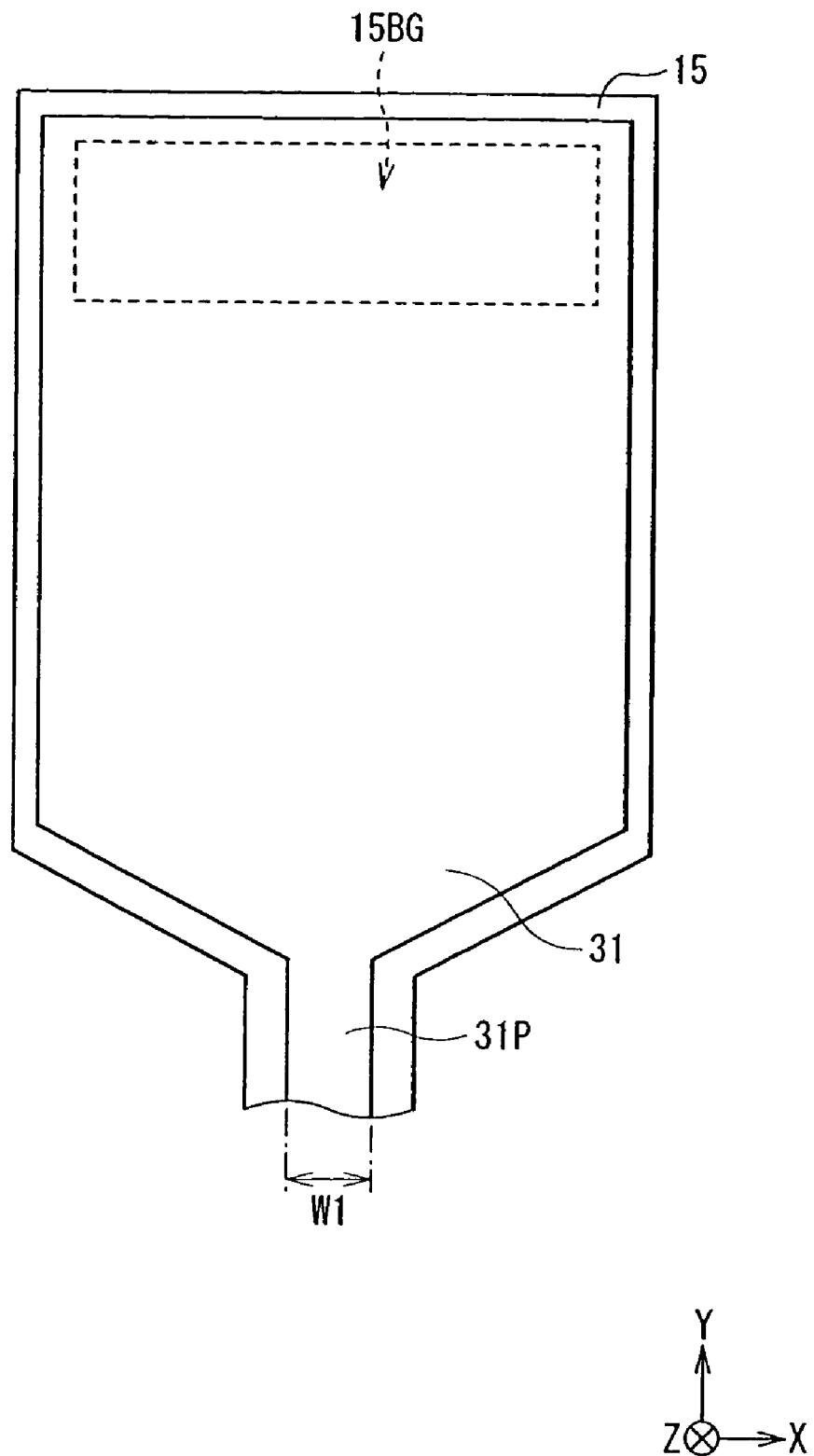
FIG. 13 is a plan view showing the configuration corresponding to the sectional configuration illustrated in FIGS. 6A and 6B.

By ashing the precursor photoresist layer 31Z to narrow the width of a corresponding portion 31ZP from W10 to W1, as shown in FIGS. 6A and 6B and FIG. 13, a photoresist layer 31 (first photoresist layer) is patterned so as to include a corresponding portion 31P having the width W1 and have a shape in plan view corresponding to the shape in plan view of the magnetic pole layer 16.

Figure 7B:
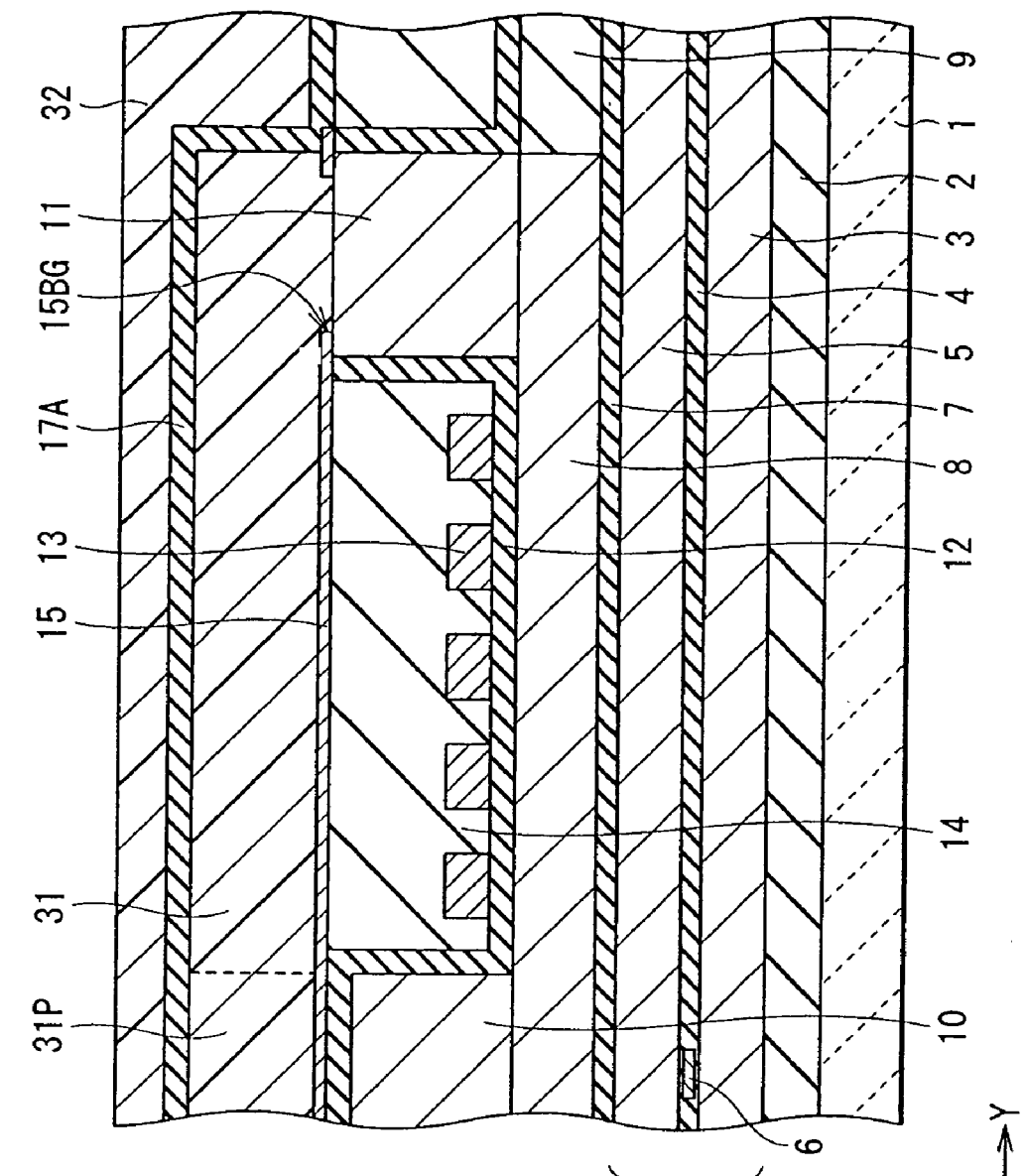
FIGS. 7A and 7B are cross sections showing a process subsequent to FIGS. 6A and 6B.
Figure 7A:
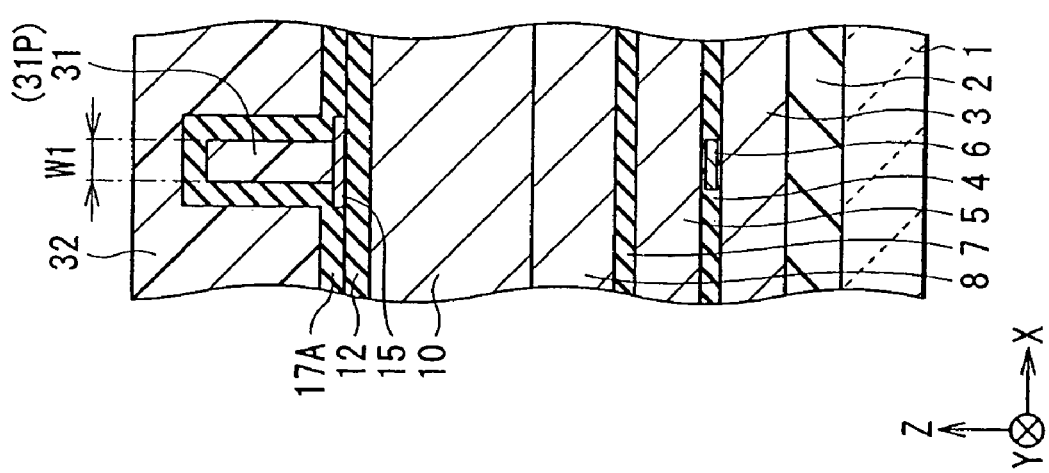
Figure 14:
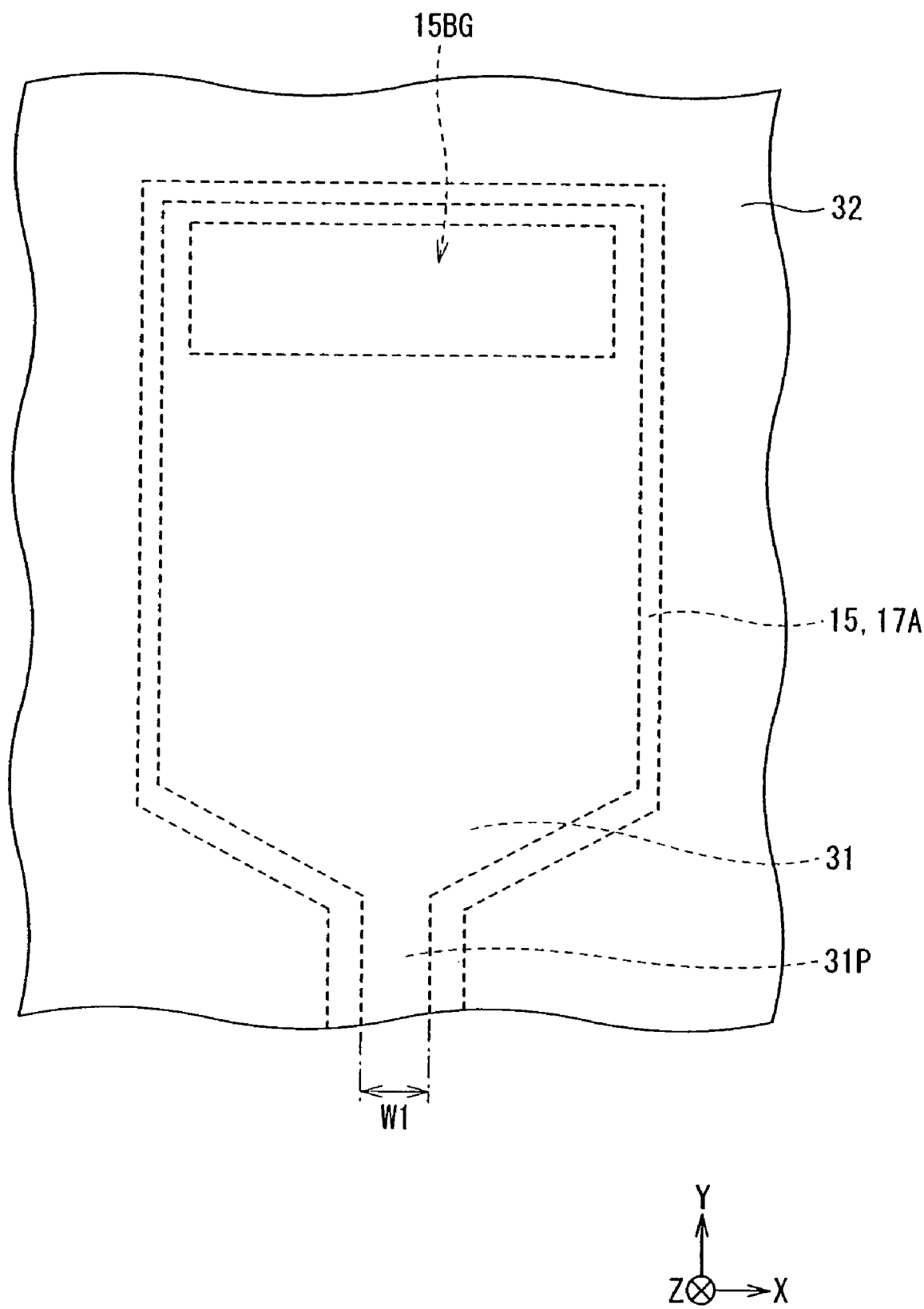
FIG. 14 is a plan view showing the configuration corresponding to the sectional configuration illustrated in FIGS. 7A and 7B.

As shown in FIGS. 7A and 7B and FIG. 14, for example, by using CVD (Chemical Vapor Deposition) or sputtering, the gap layer portion 17A made of alumina is formed to a thickness equal to or less than about 0.2 μm, concretely, about 0.1 μm so as to cover the photoresist layer 31 and its peripheral region. Subsequently, the photoresist layer 32 (second photoresist layer) is formed so as to cover the gap layer portion 17A. The photoresist layer 32 is formed so that, for example, the gap layer portion 17A is buried, that is, the level of the top face of the photoresist layer 32 is higher than that of the gap layer portion 17A.

Figures 8A, 8B:
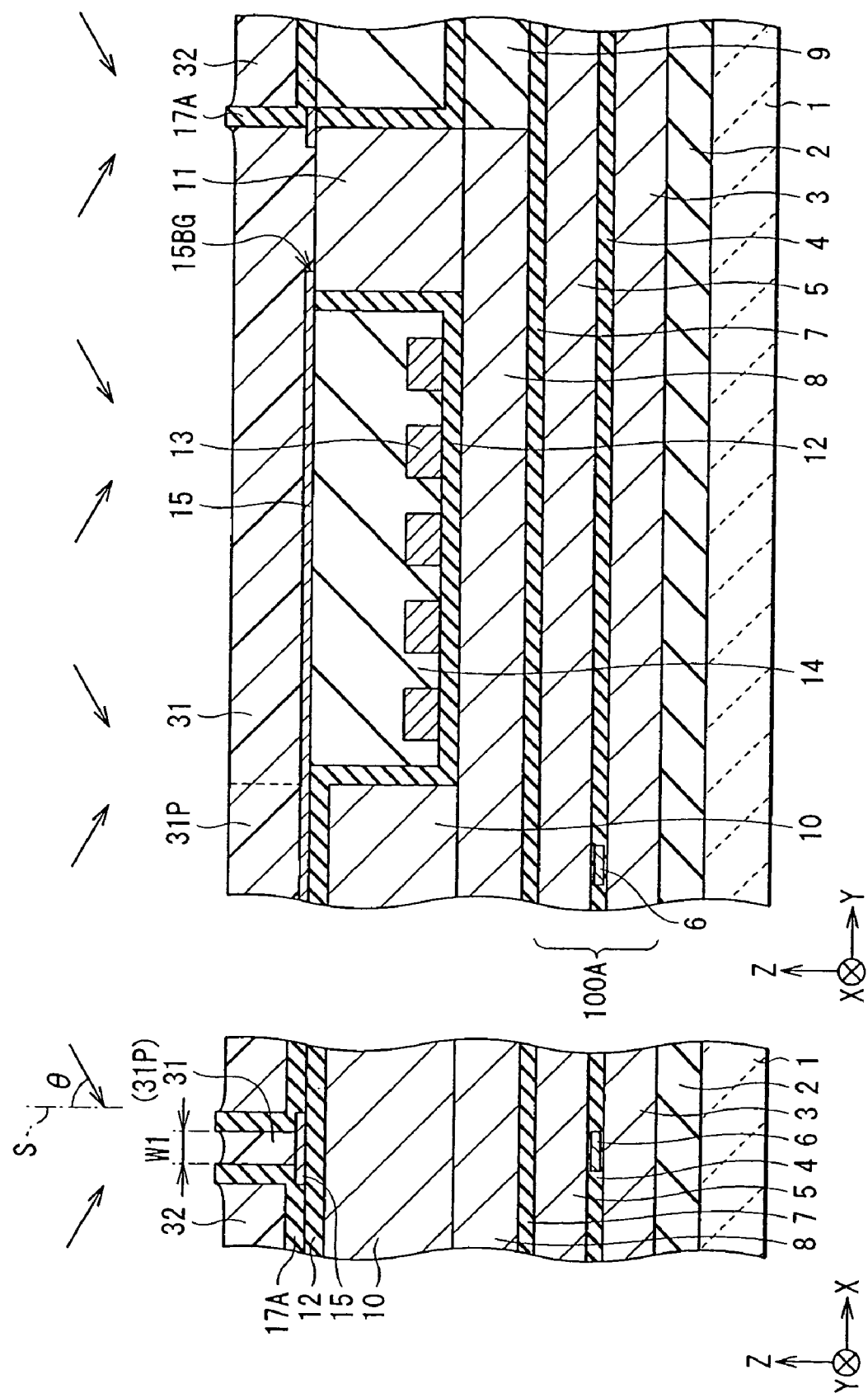
FIGS. 8A and 8B are cross sections showing a process subsequent to FIGS. 7A and 7B.
Figure 15:
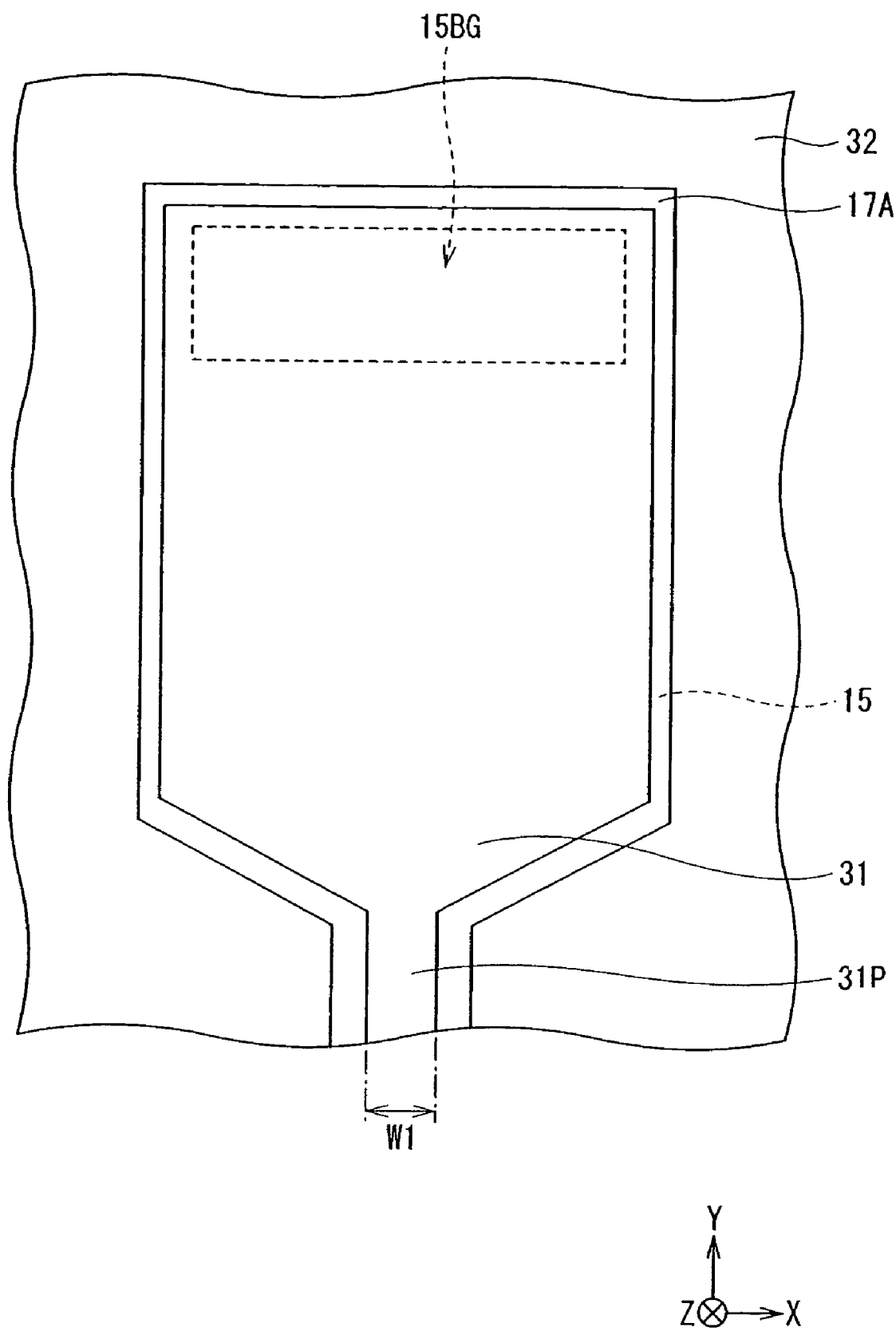
FIG. 15 is a plan view showing the configuration corresponding to the sectional configuration illustrated in FIGS. 8A and 8B.

Subsequently, by using ion milling, for example, the photoresist layer 32, gap layer portion 17A, and photoresist layer 31 are etched (over-etched) part way, thereby exposing the photoresist layer 31 as shown in FIGS. 8A and 8B and FIG. 15. At the time of performing the ion milling, for example, ion beams are emitted from directions each forming an incident angle θ in a range from about 65° to 70° with a direction S orthogonal to the extended surface of the photoresist layer 32. By performing the ion million with the etching parameter, as shown in FIG. 20, the etching rate (20A) to the photoresist (photoresist layers 31 and 32) and the etching rate (20B) to alumina (gap layer portion 17A) become close to each other and the photoresist and alumina are etched to almost the same extent. Therefore, the photoresist layers 31 and 32 and the gap layer portion 17A are etched so as to be almost planarized. To be strict, as obvious from FIG. 20, also in the case where the incident angle θ of the ion beam is set within the range, the etching rate to the photoresist becomes slightly higher than the etching rate to alumina. As shown in FIGS. 8A and 8B, the photoresist layers 31 and 32 are excessively etched more than the gap layer portion 17A.

Figures 9A, 9B:
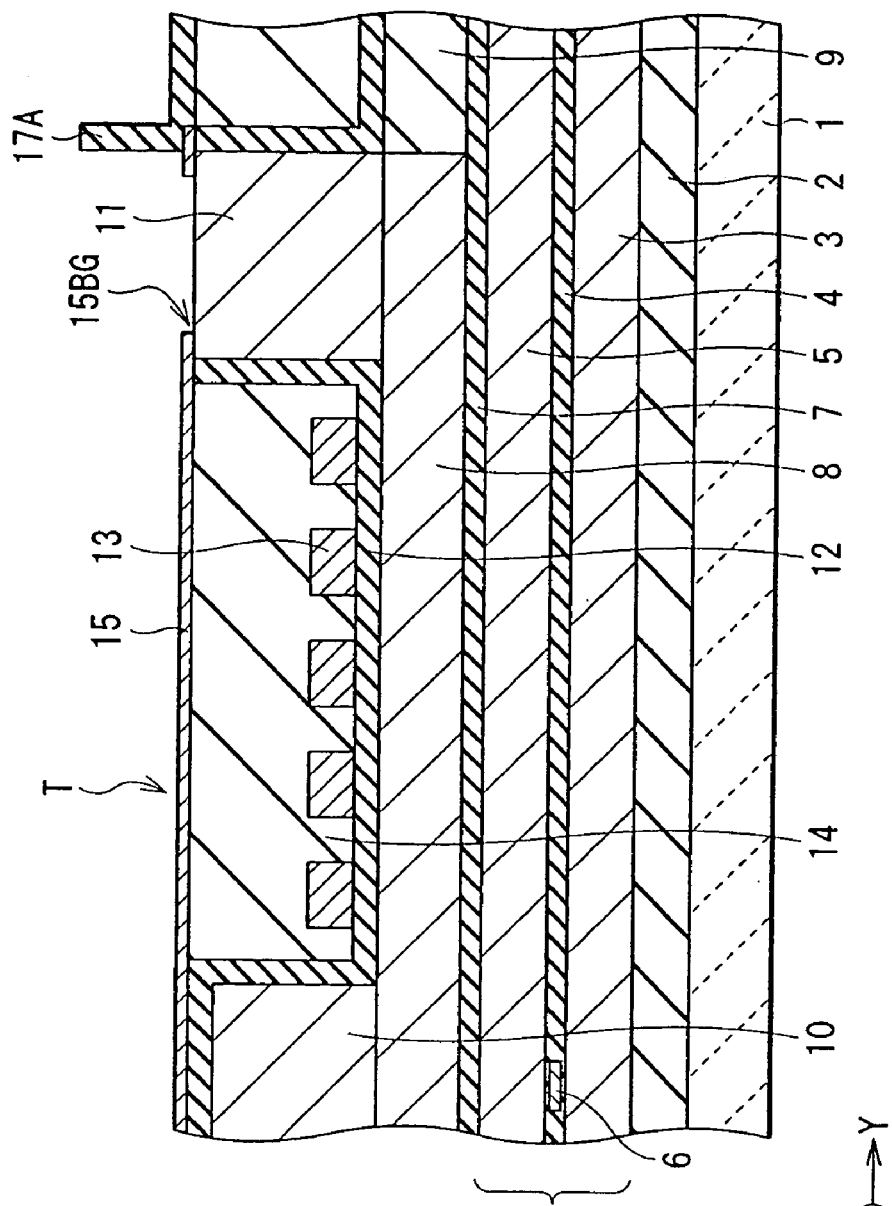
FIGS. 9A and 9B are cross sections showing a process subsequent to FIGS. 8A and 8B.
Figure 16:
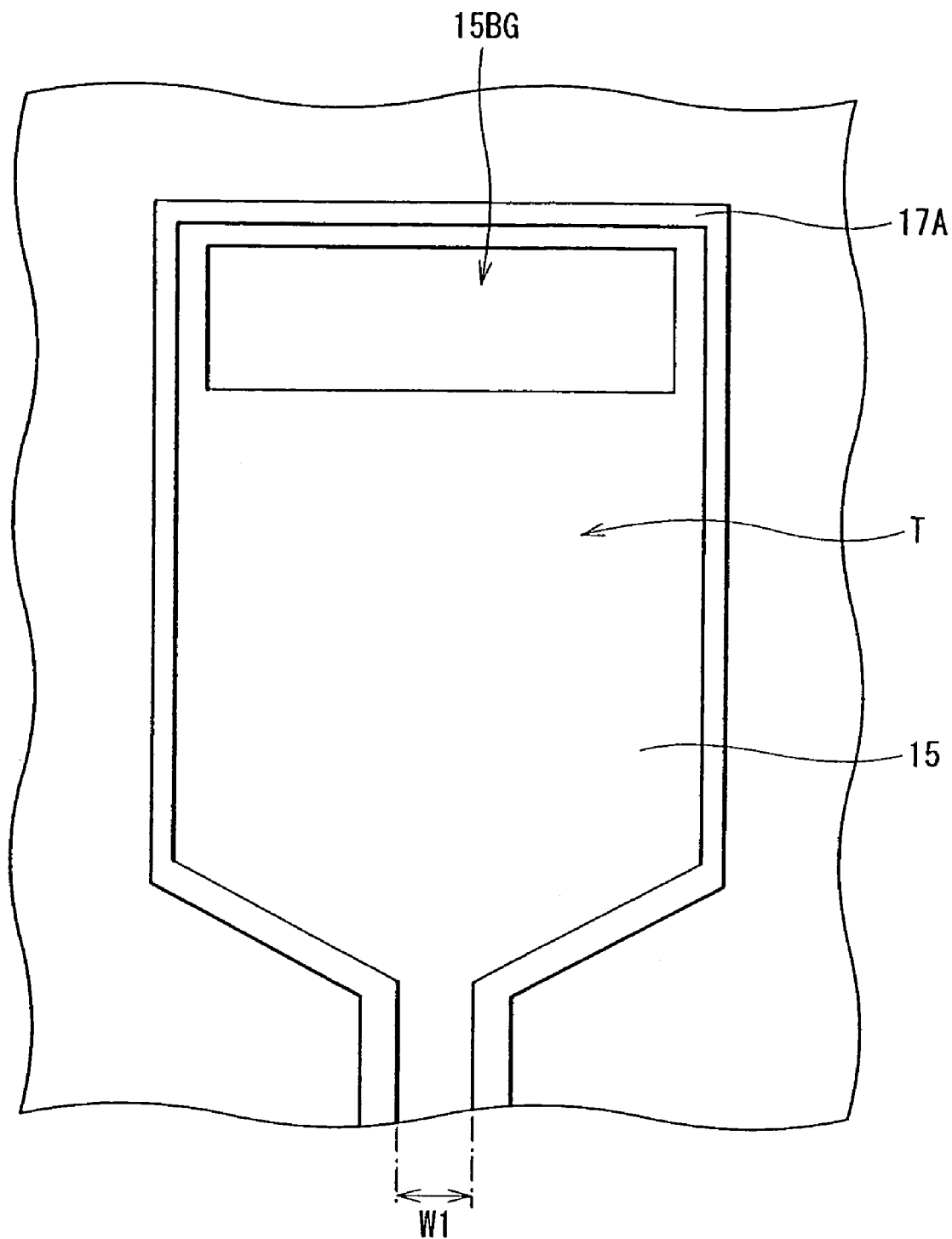
FIG. 16 is a plan view showing the configuration corresponding to the sectional configuration illustrated in FIGS. 9A and 9B.

Subsequently, by removing both of the photoresist layers 31 and 32 by ashing, as shown in FIGS. 9A and 9B and FIG. 16, a magnetic pole formation region T which is surrounded by the gap layer portion 17A is formed in a region from which the photoresist layer 31 has been removed, and the seed layer 15 is exposed in the magnetic pole formation region T. The magnetic pole formation region T is a region in which the magnetic pole layer 16 is to be formed in a post process and is a space region in which the plane shape of the photoresist layer 31 is transferred. At the time of forming the magnetic pole formation region T, for example, the etching amount of the gap layer portion 17A is adjusted in a preceding process so that the depth H of the magnetic pole formation region T becomes equal to or larger than the thickness of the magnetic pole layer 16.

Figures 10A, 10B:
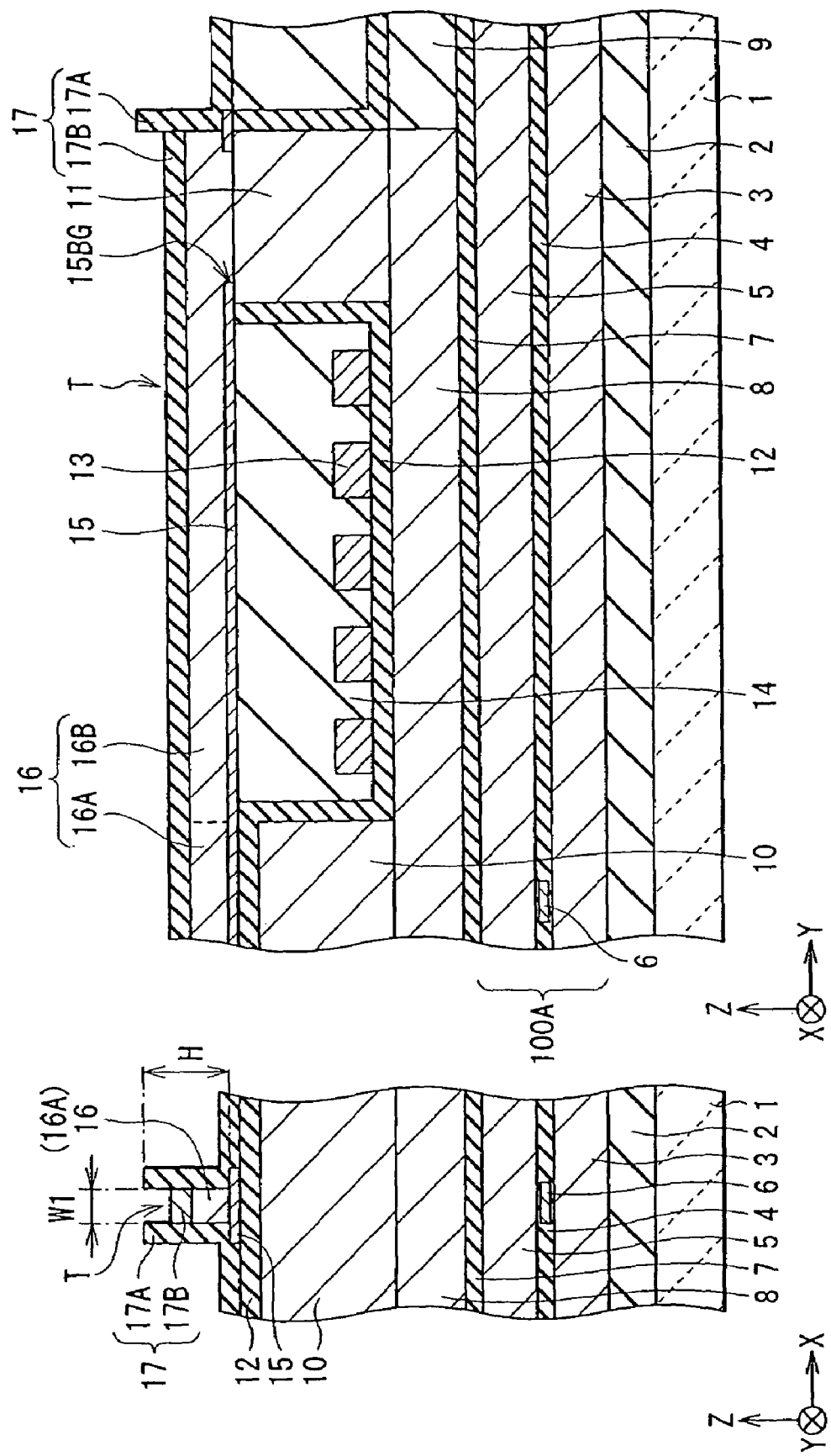
FIGS. 10A and 10B are cross sections showing a process subsequent to FIGS. 9A and 9B.
Figure 17:
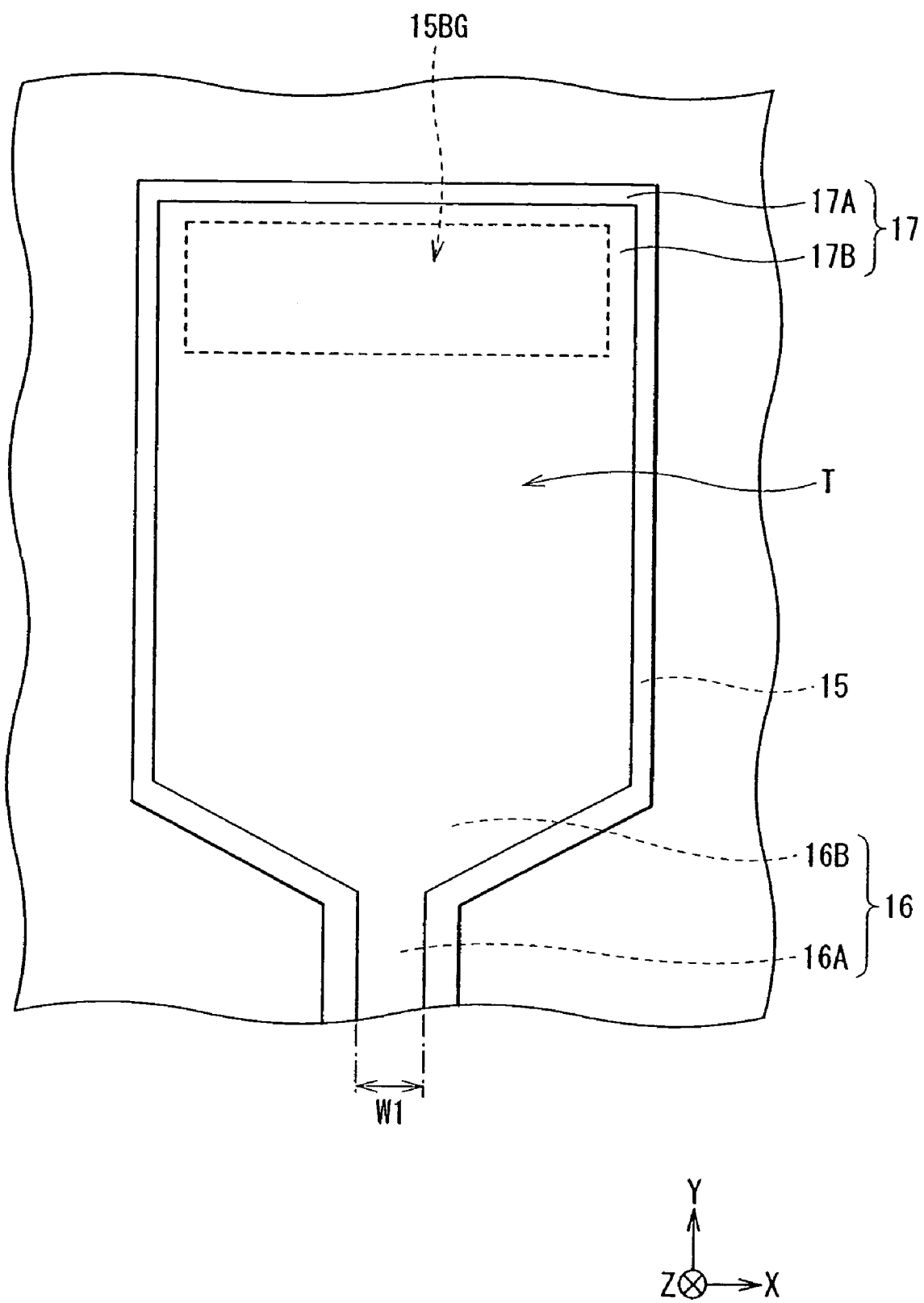
FIG. 17 is a plan view showing the configuration corresponding to the sectional configuration illustrated in FIGS. 10A and 10B.

Subsequently, current is passed to the seed layer 15, thereby growing a plating film made of a magnetic material such as an iron cobalt base alloy (FeCo) or a cobalt iron nickel base alloy (CoFeNi) in the magnetic pole formation region T, thereby forming the magnetic pole layer 16 in the pattern as shown in FIGS. 10A and 10B and FIG. 17. By the growth of the plating film in the magnetic pole formation region T in which the shape in plan view of the photoresist layer 31 has been transferred, the magnetic pole layer 16 is formed so as to include, from the front side, the tip portion 16A having the width W1 and the rear end portion 16B connected to the tip portion 16A.

Subsequently, the plating film made of a non-magnetic metal material such as rhodium (Rh) or a non-magnetic metal compound material such as nickel phosphorus (NiP) is grown on the magnetic pole layer 16 in the magnetic pole formation region T by continuously using the seed layer 15, thereby forming the gap layer portion 17B to the thickness of about 0.05 μm as shown in FIGS. 10A and 10B and FIG. 17. By the operations, the magnetic pole layer 16 is surrounded by the gap layer 17 consisting of the gap layer portions 17A and 17B from the three directions.

Figures 11A, 11B:
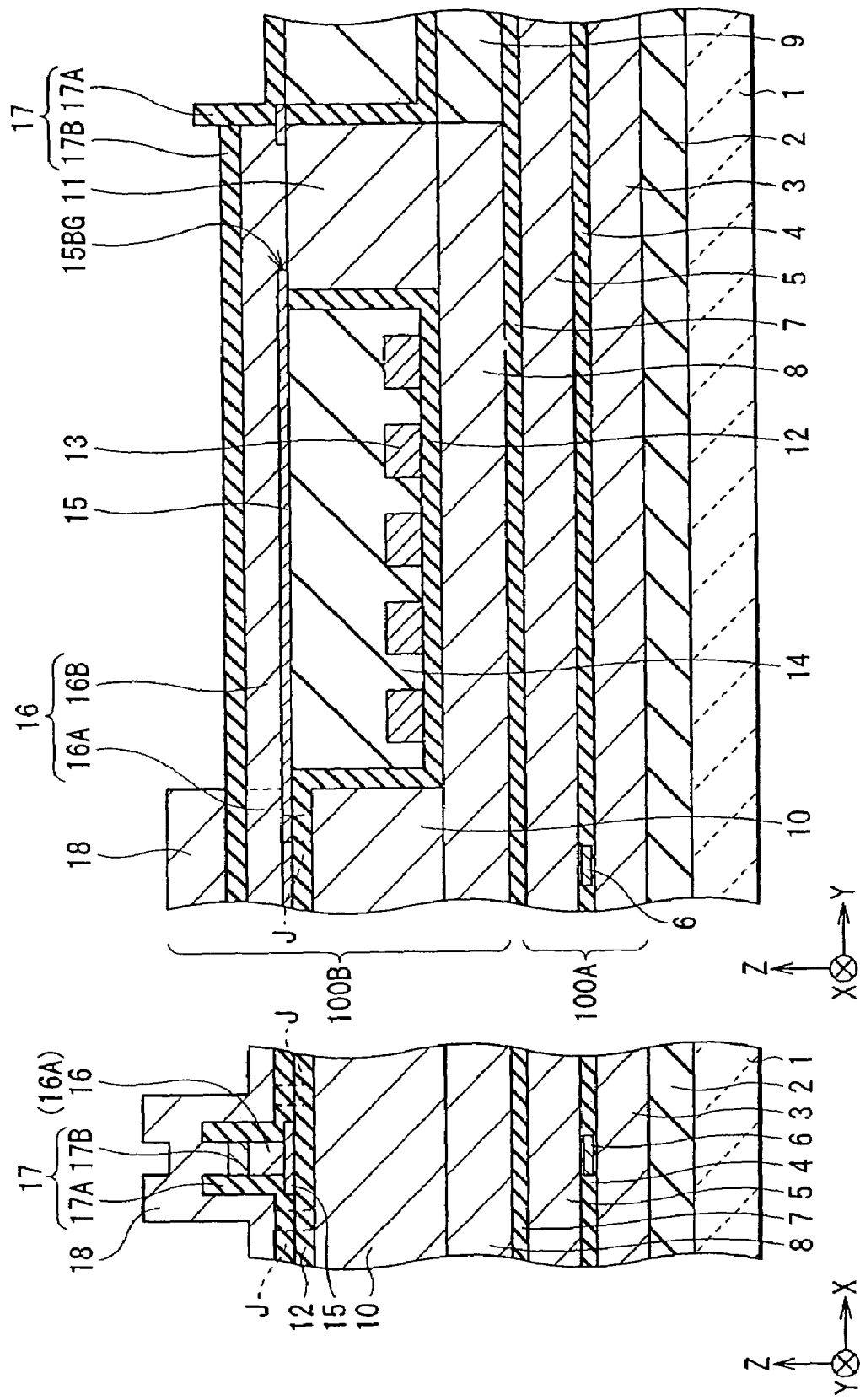
FIGS. 11A and 11B are cross sections showing a process subsequent to FIGS. 10A and 10B.
Figure 18:
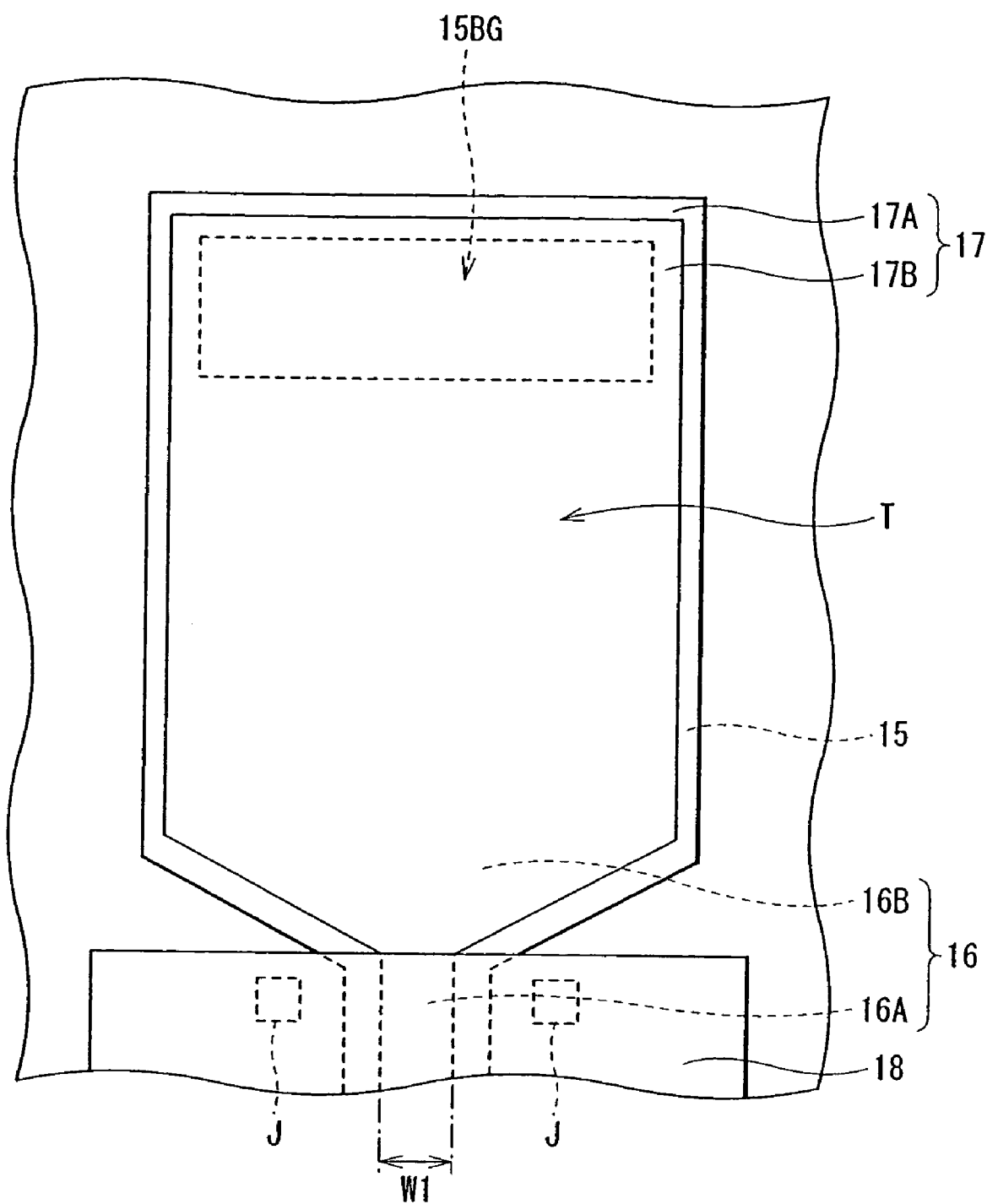
FIG. 18 is a plan view showing the configuration corresponding to the sectional configuration illustrated in FIGS. 11A and 11B.

As shown in FIGS. 11A and 11B and FIG. 18, by selectively etching both the insulating layer 12 and the gap layer portion 17A, the two connection through holes J are selectively formed. Finally, a frame pattern (not shown) made by a photoresist is formed on the gap layer 17 and, after that, a plating film made of permalloy or a cobalt iron nickel alloy is grown in the frame pattern, thereby forming the write shield layer 18 having a thickness of about 0.2 μm to 1.0 μm as shown in FIGS. 11A and 11B and FIG. 18. At the time of forming the write shield layer 18, for example, as shown in FIG. 11A, the tip portion 16A of the magnetic pole layer 16 is surrounded from the three directions of the trailing direction (upward direction in the drawing) and two side directions (lateral directions in the drawing). In such a manner, the main components of the recording head portion 100B are completed.

Since the characteristic manufacturing process is used in the method of manufacturing the thin film magnetic head according to the embodiment, the thin film magnetic head having the write shield layer 18 disposed so as to surround the tip portion 16A of the magnetic pole layer 16 from three directions can be formed easily with high precision for the following three reasons.

Figure 21:
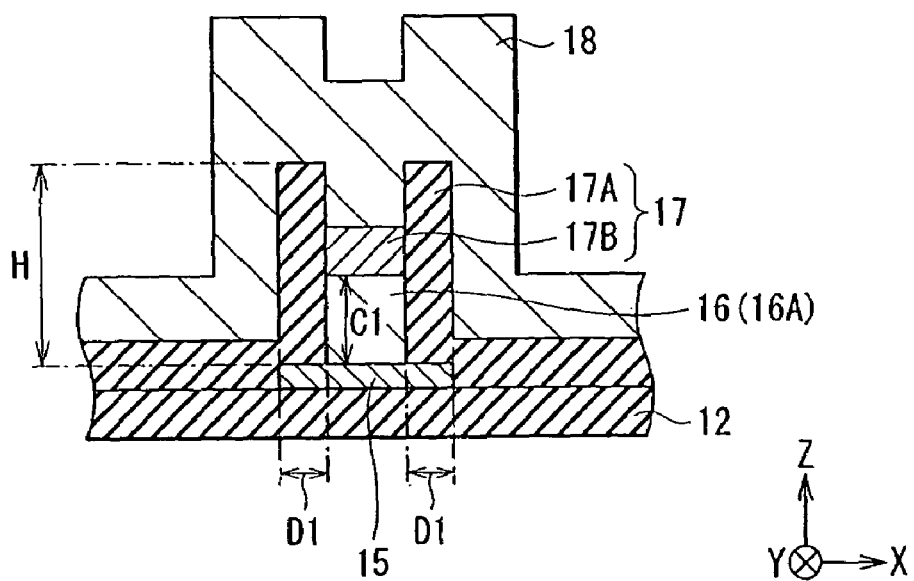
FIG. 21 is a cross section for explaining an advantage of a method of manufacturing a thin film magnetic head according to an embodiment of the invention.
Figure 22:
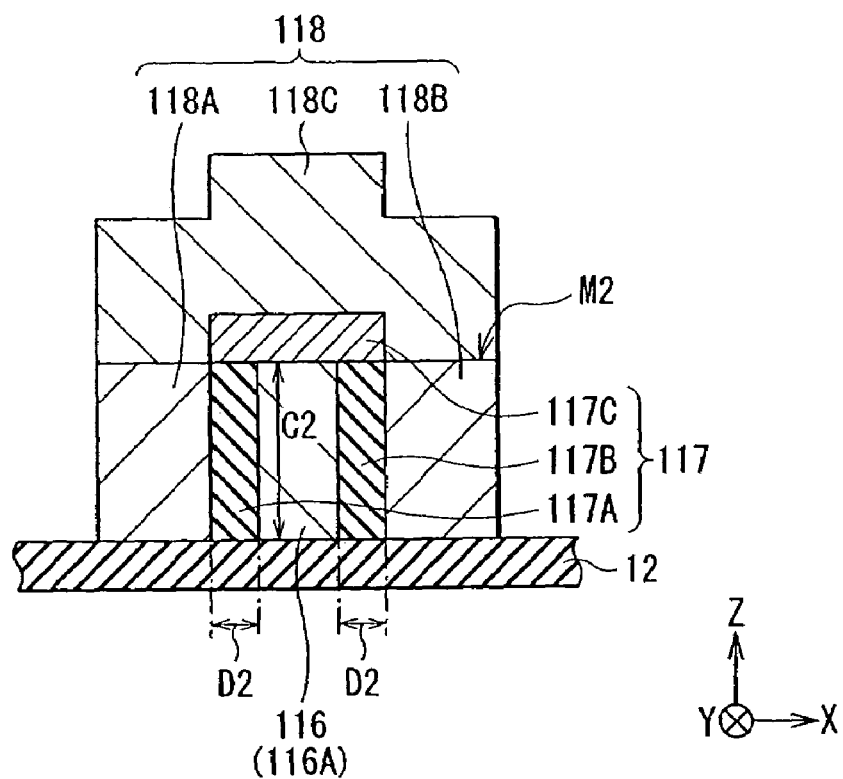
FIG. 22 is a cross section for explaining problems of a method of manufacturing a thin film magnetic head as a comparative example of the method of manufacturing a thin film magnetic head according to an embodiment of the invention.

First, the gap length between the magnetic pole layer 16 and the write shield layer 18 can be controlled with high precision. FIG. 21 is a diagram for explaining the advantage of the method of manufacturing a thin film magnetic head according to the embodiment. FIG. 22 is a diagram for explaining the problem of the method of manufacturing a thin film magnetic head as a comparative example of the embodiment. Each of FIGS. 21 and 22 shows an enlarged sectional configuration of the main components of the thin film magnetic head illustrated in FIG. 1A.

As shown in FIG. 22, the main components of the thin film magnetic head of the comparative example include: the magnetic pole layer 116 (tip portion 116A); the write shield layer 118 constructed by three portions (write shield layer portions 118A, 118B, and 118C) and disposed so as to surround the magnetic pole layer 116 from three directions; and the gap layer 117 constructed by three portions (gap layer portions 117A, 117B, and 117C) and disposed so as to be sandwiched by the magnetic pole layer 116 and the write shield layer 118.

The main components of the thin film magnetic head are formed, for example, by the following procedure. First, by using a plating process, the write shield layer portions 118A and 118B are formed on both sides of the magnetic pole layer 116 with a gap D2 together with the magnetic pole layer 116. After that, by using sputtering, the gap layer portions 117A and 117B are formed so as to bury the gap D2, thereby constructing the flat face M2. Subsequently, by continuously using sputtering, the gap layer portion 117C is formed so as to cover the trailing side of the magnetic pole layer 116. After that, by using a plating process, the write shield layer portion 118C is formed on the gap layer portion 117C so as to be connected to the write shield layer portions 118A and 118B. In such a manner, the main components of the thin film magnetic head are completed.

By using the manufacturing process, the write shield layer 118 can be formed so as to surround the magnetic pole layer 116 from three directions. In this case, the gap D2 is specified on the basis of pattern precision of the photolithography technique employed at the time of forming the write shield layer portions 118A and 118B, so that the formation precision of the gap D2 is not sufficiently high. The gap D2 is one of factors exerting an influence on the recording characteristics. Concretely, when the gap D2 is too narrow, the magnetic flux emitted from the magnetic pole layer 116 does not easily spread to both sides but the recording magnetic field intensity deteriorates. On the other hand, when the gap D2 is too wide, the recording magnetic field intensity is high but the magnetic flux tends to spread to both sides. Consequently, the gap D2 has to be controlled with high precision to a desired value. In the comparative example, precision of formation of the gap D2 is insufficient, so that the gap D2 cannot be controlled with high precision.

In the embodiment, as shown in FIG. 21, the gap D1 between the magnetic pole layer 16 and the write shield layer 18 is specified on the basis of the thickness of the gap layer portion 17A. In this case, different from the comparative example in which the gap D2 is specified on the basis of the pattern precision of the photolithography technique, the gap D1 is controlled on the basis of film formation time of sputtering at the time of forming the gap layer portion 17A, so that the formation precision of the gap D1 becomes sufficient. Therefore, the gap D1 can be controlled with high precision. Concretely, for example, the gap D1 can be controlled with high precision so as to achieve a very narrow width of about 0.1 μm or less.

Second, the thickness of the magnetic pole layer 16 can be controlled with high precision. To be specific, in the case of the comparative example (refer to FIG. 22), to form the flat face M2, the whole has to be polished by using a polishing technique such as CMP (Chemical Mechanical Polishing). In this case, however, the thickness C2 of the magnetic pole layer 116 is specified on the basis of the polishing precision, so that the formation precision of the thickness C2 of the magnetic pole layer 116 is insufficient. In contrast, in the embodiment (refer to FIG. 21), the thickness C1 of the magnetic pole layer 16 is specified on the basis of the thickness of the film formed at the time of the plating process. In this case, different from the comparative example in which the thickness C2 of the magnetic pole layer 116 is specified on the basis of the polishing precision, the thickness C1 of the magnetic pole layer 16 is controlled on the basis of the process time (film formation time) of the plating process, so that the formation precision of the thickness C1 is assured. Thus, the thickness C1 of the magnetic pole layer 16 can be controlled with high precision.

Third, the write shield layer 18 having the characteristic configuration of surrounding the tip portion 16A of the magnetic pole layer 16 from three directions can be easily formed. In the comparative example (refer to FIG. 21), the write shield layer 118 is constructed by three portions (write shield layer portions 118A, 118B, and 118C), to form the write shield layer 118, as described above, at least two processes of a process of forming the write shield layer portions 118A and 118B and a process of forming the write shield layer portion 118C are necessary. In this case, the process of forming the write shield layer 118 becomes complicated and long time is required. In contrast, in the embodiment (refer to FIG. 21), the write shield layer 18 is formed as a single body, so that a single process is necessary to form the write shield layer 18 and the process of forming the write shield layer 18 is facilitated. Obviously, in the embodiment, different from the comparative example, the polishing process is not required, so that the forming process is facilitated also from this viewpoint. Therefore, the write shield layer 18 can be easily formed.

In addition, in the embodiment, the seed layer 15 is formed so as to be in a predetermined pattern shape by patterning the precursor seed layer 15Z, and the seed layer 15 is selectively disposed only in necessary portions. After that, the magnetic pole layer 16 and the gap layer portion 17B are formed by using the seed layer 15. Consequently, different from the case where the seed layer 15 is formed on the whole surface without being patterned, it is unnecessary to remove unnecessary portions of the seed layer 15 after forming the magnetic pole layer 16 and the like. Therefore, in this viewpoint as well, the invention can contribute to facilitate the manufacturing of the thin film magnetic head.

In particular, in the embodiment, the gap layer portions 17A and 17B constructing the gap layer 17 are formed in different processes. Different from the case of integrally forming the gap layer portions 17A and 17B in a single process, the thickness of each of the gap layer portions 17A and 17B can be controlled independently. For example, the gap layer 17 can be formed so that the gap layer portion 17A is thicker than the gap layer portion 17B.

In the embodiment, as shown in FIG. 19, the plurality of seed layers 15 are connected to the lead layer 50 on the wafer 40, so that current can be simultaneously passed to the plurality of seed layers 15 by using the lead layer 50. After completion of the thin film magnetic head, the wafer 40 is diced and the lead layer 50 is removed, thereby enabling the seed layers 15 to be electrically isolated from each other.

In the embodiment, the outline of the seed layer 15 is set to be larger than that of the magnetic pole layer 16. Consequently, even if the formation position of the seed layer 15 is deviated a little, the magnetic pole layer 16 can be stably formed by using the seed layer 15.

In the embodiment, at the time of forming the magnetic pole layer 16 and the gap layer portion 17B by using the plating process, in any of the cases, the seed layer 15 is used. It is therefore unnecessary to form a seed layer each time the magnetic pole layer 16 or the gap layer portion 17B is formed. Thus, the invention can contribute to facilitate the manufacturing of the thin film magnetic head also from this viewpoint.

In the embodiment, at the time of forming the photoresist layer 31, the precursor photoresist layer 31Z including the corresponding portion 31ZP (having width W10) is formed and, after that, the corresponding portion 31ZP is narrowed from W10 to W1 by ashing the precursor photoresist layer 31Z. Consequently, by using the ashing process on the photoresist, the corresponding portion 31P can be formed with high precision so as to have the very narrow width W1 which cannot be realized with the pattern precision of the photolithography technique. Accordingly, the tip portion 16A of the magnetic pole layer 16 can be also formed with high precision. Concretely, the width of the corresponding portion 31P which can be formed with sufficiently high precision at the time of using the photolithography technique is about 0.2 μm. In contrast, in the embodiment using the ashing process, the corresponding portion 31P can be formed with high precision so that its width becomes less than about 0.2 μm. To form the corresponding portion 31P having the very narrow width W1, for example, a method of forming the corresponding portion 31ZP having the width W10 and, after that, narrowing the width of the corresponding portion 31ZP by using an etching technique such as ion milling can be also employed. However, the precision of the narrowing process by the ashing process to a width less than about 0.2 μm is higher than that of the etching technique. Therefore, it is preferable to use the ashing process at the time of forming the corresponding portion 31P with high precision.

In the embodiment, as shown in FIGS. 7A and 7B and FIGS. 8A and 8B, at the time of etching the photoresist layers 31 and 32 and the gap layer portion 17A by using ion milling, the incident angle θ of an ion beam is set within the range from 65° to 70°, so that the etching rate of the photoresist layers 31 and 32 and that of the gap layer portion 17A become close to each other and the photoresist layers 31 and 32 and the gap layer portion 17A are etched so as to be almost planarized. Therefore, it can prevent a situation such that the photoresist layers 31 and 32 softer than the gap layer portion 17A are excessively etched and dissipated and, after that, parts in the seed layer 15 and the gap layer portion 17A, which are not intended to be etched, are unintentionally etched. In particular, by using the etching technique, as compared with the case of using the polishing technique such as CMP requiring longer time for a process, etching process can be performed in shorter time.

In the embodiment, as shown in FIGS. 9A and 9B and FIG. 21, when the magnetic pole formation region T for forming the magnetic pole layer 16 is formed, the depth H of the magnetic pole formation region T is set to be larger than the thickness C1 of the magnetic pole layer 16, so that the depth H has a margin with respect to the thickness C1. Therefore, an inconvenience which may occur in the case where the depth H is made coincide with the thickness C1, that is, an inconvenience that the magnetic pole layer 16 is formed thickly due to a formation precision error of the thickness C1 or the like and, as a result, the magnetic pole layer 16 and the write shield layer 18 are unintentionally connected to each other can be avoided.

The thin film magnetic head according to the embodiment has the gap layer portions 17A adjacent to the magnetic pole layer 16 in the two side directions, the gap layer portion 17B adjacent to the magnetic pole layer 16 in the trailing direction, and the write shield layer 18 surrounding the tip portion 16A of the magnetic pole layer 16 from three directions of the trailing direction and the two side directions via the gap layer portions 17A and 17B. Consequently, the thin film magnetic head can be manufactured by using the method of manufacturing the thin film magnetic head according to the embodiment.

Figure 23:
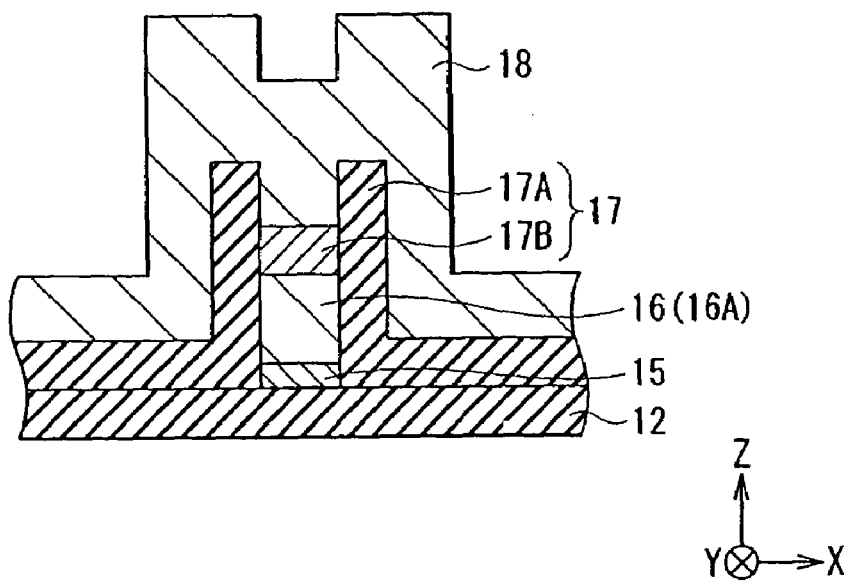
FIG. 23 is a cross section showing a modification of the configuration of the thin film magnetic head illustrated in FIG. 21.

Although, in the embodiment, as shown in FIG. 21, the outline of the seed layer 15 is set to be larger than that of the magnetic pole layer 16, the invention is not limited to the arrangement. For example, as shown in FIG. 23, the outline of the seed layer 15 may be equal to that of the magnetic pole layer 16. In this case as well, effects similar to those of the foregoing embodiment can be obtained. As described above, when the inconvenience that the magnetic pole layer 16 cannot be stably formed due to a deviation of the formation position of the seed layer 15 is considered, it is preferable to set the outline of the seed layer 15 to be larger than that of the magnetic pole layer 16 as shown in FIG. 21.

Figure 24:
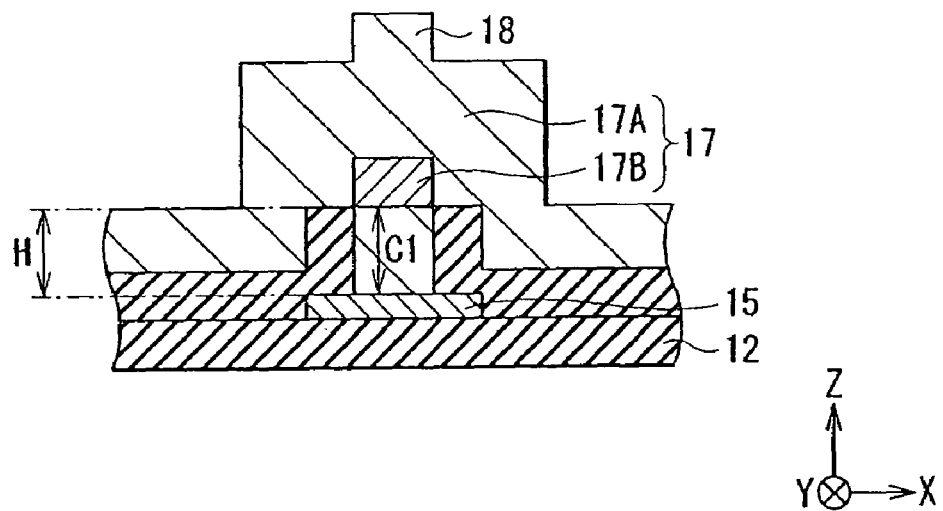
FIG. 24 is a cross section showing another modification of the configuration of the thin film magnetic head illustrated in FIG. 21.

In the embodiment, as shown in FIG. 21, the depth H of the magnetic pole formation region T is set to be larger than the thickness C1 of the magnetic pole layer 16. However, the invention is not always limited to this arrangement. For example, as shown in FIG. 24, the depth H may be equal to the thickness C1. In this case as well, effects similar to those of the foregoing embodiment can be obtained. As described above, when the inconvenience that the magnetic pole layer 16 and the write shield layer 18 are unintentionally coupled to each other due to a precision error of the thickness C1 is considered, it is preferable to set the depth H to be larger than the thickness C1.

In the embodiment, as shown in FIGS. 7A and 7B and FIGS. 8A and 8B, to make the photoresist layer 31 expose to the outside, the photoresist layer 32, gap layer portion 17A, and photoresist layer 31 are over-etched. However, the invention is not always limited to the arrangement. For example, only the photoresist layer 32 and the gap layer portion 17A may be over-etched. In this case as well, effects similar to those of the foregoing embodiment can be obtained. However, when considering the inconvenience such that the photoresist layer 31 is not exposed due to a precision error of the etching amount in the case where only the photoresist layer 32 and the gap layer portion 17A are over-etched, it is preferable to over-etch the photoresist layer 31 together with the photoresist layer 32 and the gap layer portion 17A.

Figures 29A, 29B:
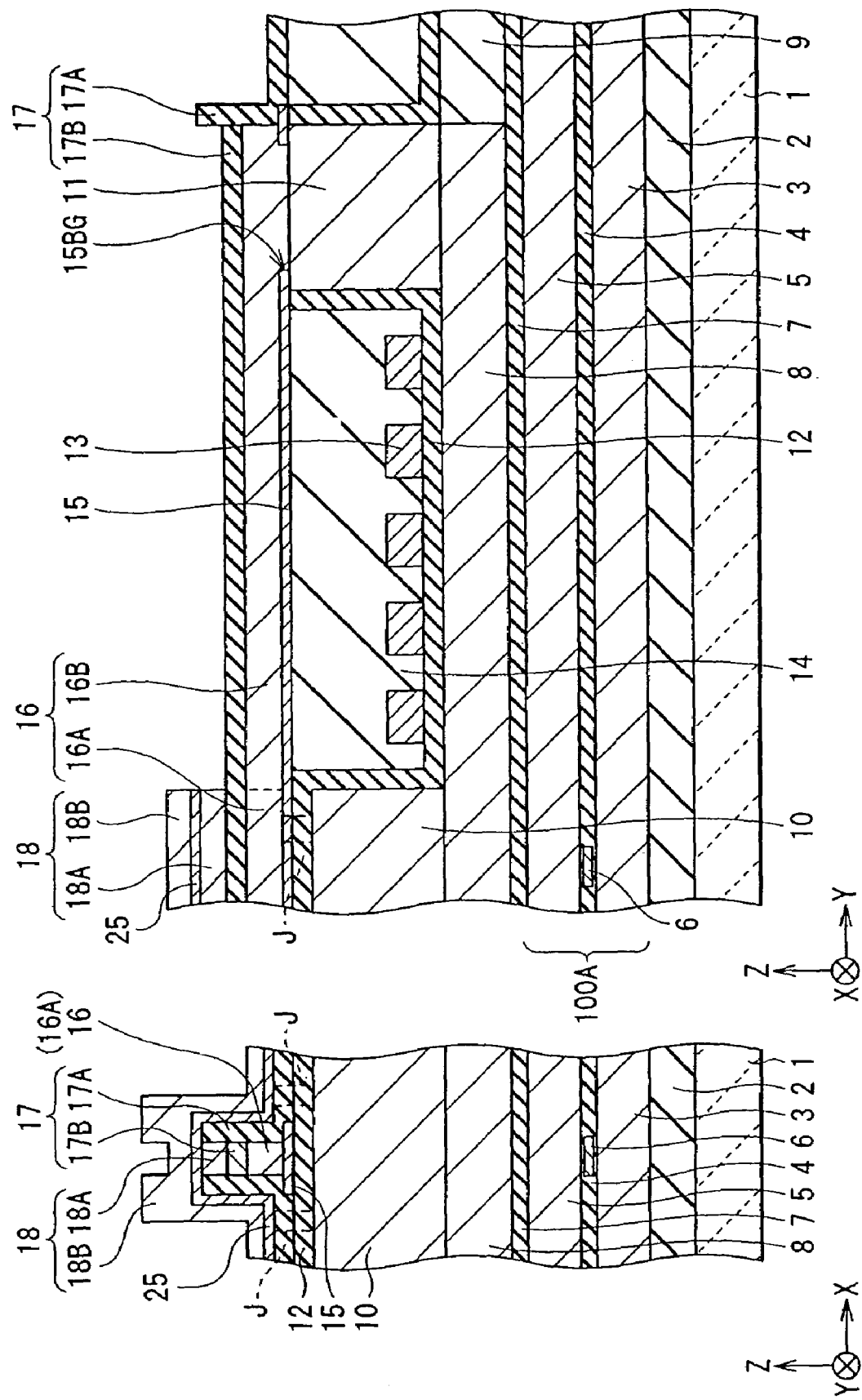
FIGS. 29A and 29B are cross sections showing a process subsequent to FIGS. 28A and 28B.
Figures 30A, 30B:
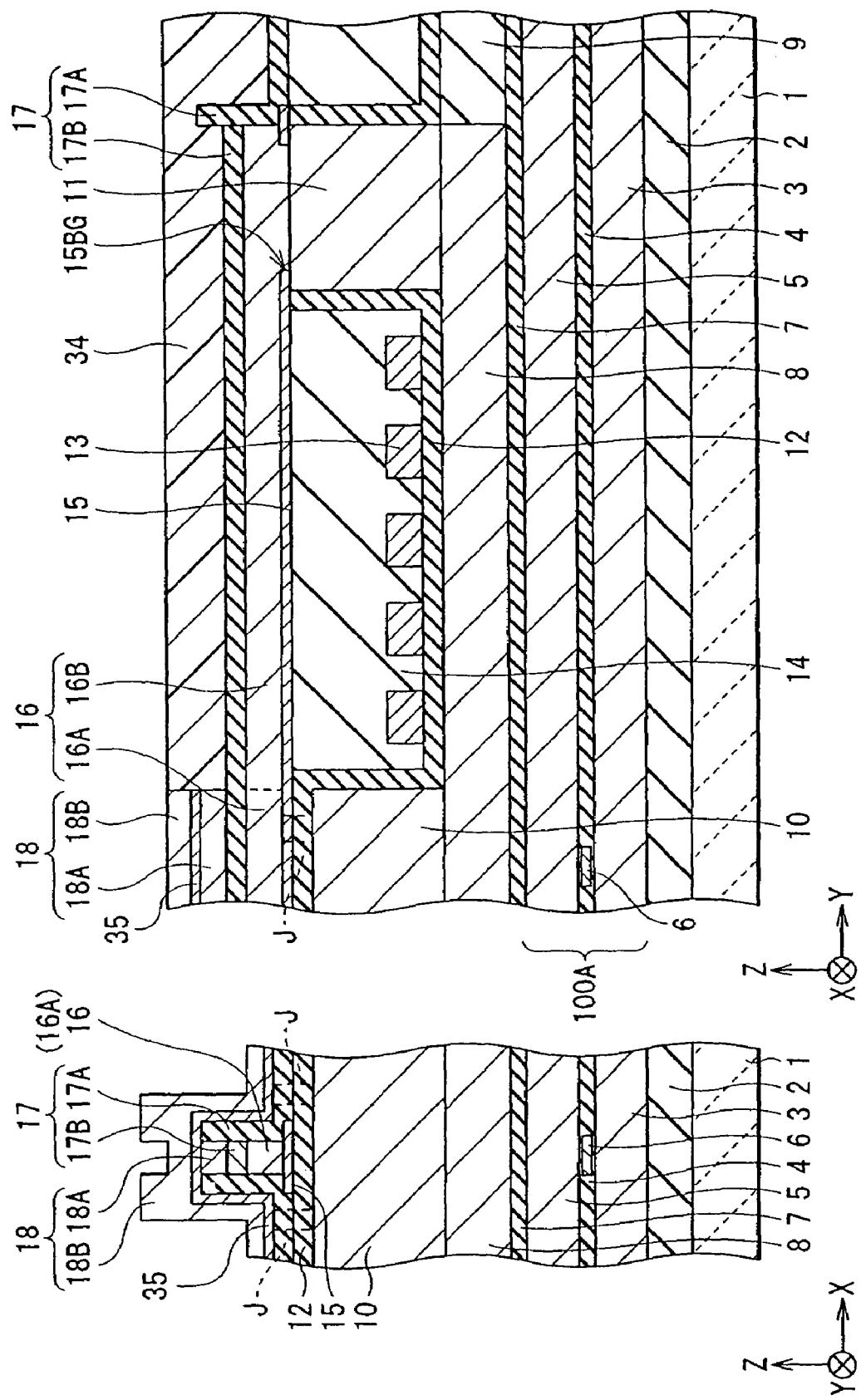
FIGS. 30A and 30B are cross sections for explaining a process in a manufacturing process of a third modification of the method of forming the write shield layer.

In the embodiment, as shown in FIGS. 11A and 11B, the write shield layer 18 is formed by the single process. The invention, however, is not always limited to the method but, for example, the write shield layer 18 may be formed by a plurality of processes. FIGS. 25A and 25B to FIGS. 30A and 30B are diagrams for explaining three modifications of the method of forming the write shield layer 18. FIGS. 25A and 25B to FIGS. 27A and 27B show a first modification. FIGS. 28A and 28B to FIGS. 29A and 29B show a second modification. FIGS. 30A and 30B show a third modification.

Figures 25A, 25B:
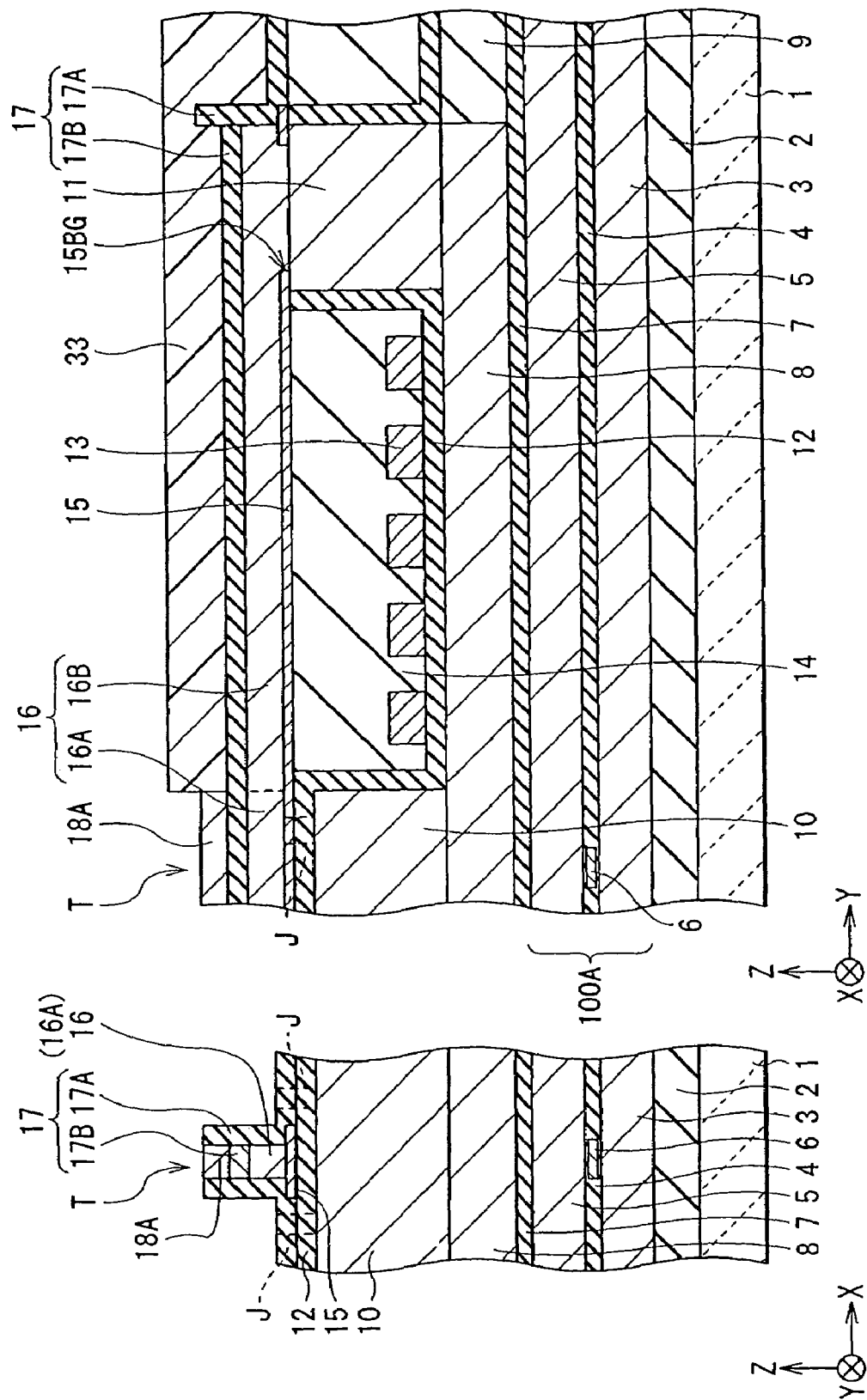
FIGS. 25A and 25B are cross sections for explaining one of forming processes of a first modification of the method of forming a write shield layer.
Figures 26A, 26B:
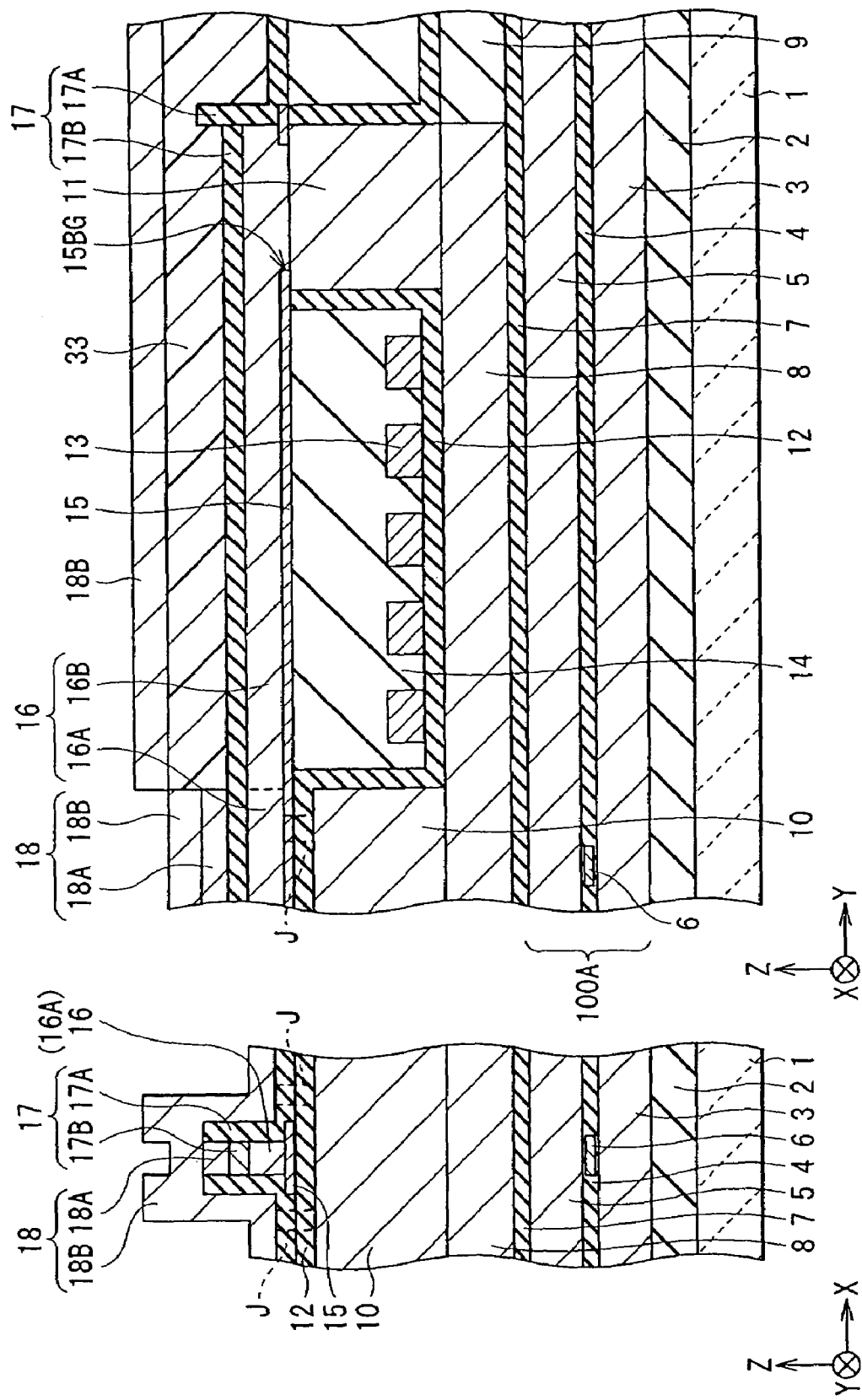
FIGS. 26A and 26B are cross sections showing a process subsequent to FIGS. 25A and 25B.
Figures 27A, 27B:
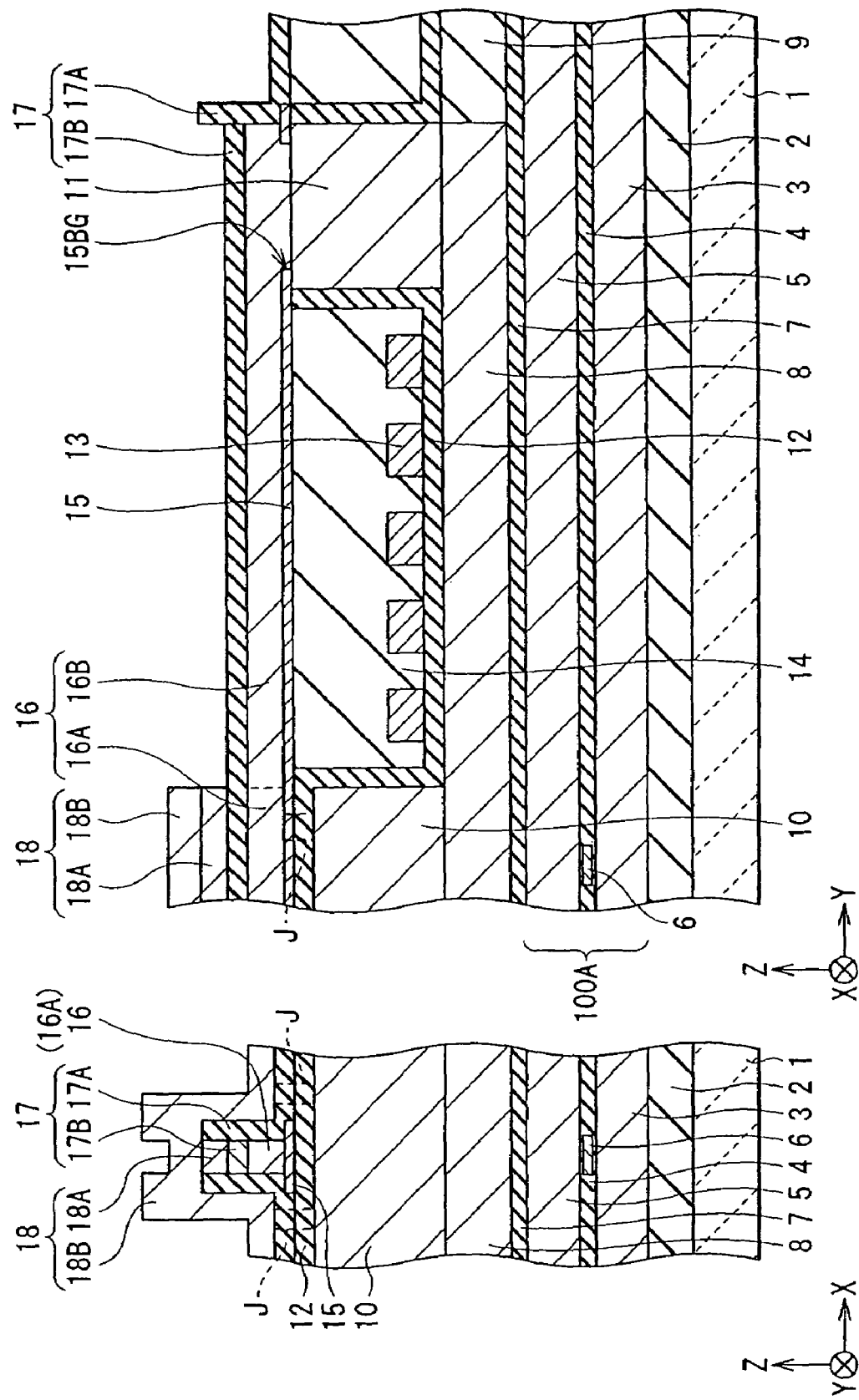
FIGS. 27A and 27B are cross sections showing a process subsequent to FIGS. 26A and 26B.

In the first modification, as shown in FIGS. 10A and 10B, the gap layer 17B is formed. After that, as shown in FIGS. 25A and 25B, the photoresist film is patterned by using the photolithography technique, thereby forming a frame pattern 33 so as to cover the region other than the formation region of the write shield layer 18. Subsequently, by selectively growing a plating film on the gap layer 17B in the magnetic pole formation region T by using the frame pattern 33 and the seed layer 15, a write shield layer portion 18A (first magnetic shield layer portion) as a part of the write shield layer 18 is patterned. Subsequently, as shown in FIGS. 26A and 26B, for example, by using sputtering, a write shield layer portion 18B (second magnetic shield layer portion) as another part of the write shield layer 18 is formed so as to cover the gap layer portion 17A, write shield layer portion 18A, and frame pattern 33. At the time of forming the write shield layer portion 18A, the front portion of the write shield layer portion 18A is set to surround the tip portion 16A of the magnetic pole layer 16 from three directions of the trailing direction and two side directions. Finally, the frame pattern 33 is lifted off together with the excessive write shield layer portion 18B while partially leaving the write shield layer portion 18B, thereby forming the write shield layer 18 as an assembly of the write shield layer portions 18A and 18B as shown in FIGS. 27A and 27B.

In the second modification, the frame pattern 33 is formed together with the write shield layer portion 18A by using a method similar to that of the first modification. After that, first, as shown in FIGS. 28A and 28B, a seed layer 25 for performing a plating process is formed by using, for example, sputtering so as to cover the gap layer portion 17A, write shield layer portion 18A, and frame pattern 33. At the time of forming the seed layer 25, for example, by partly connecting the seed layer 25 to the seed layer 15, current can be passed to the seed layer 25 via the seed layer 15. Subsequently, by selectively growing a plating film by using the seed layer 25 together with the frame pattern 33, the write shield layer portion 18B is formed in a pattern. Finally, by lifting off the frame pattern 33 together with the excessive seed layer 25, as shown in FIGS. 29A and 29B, the write shield layer 18 including the write shield layer portions 18A and 18B is formed.

As the third modification, the write shield layer portion 18A is formed by using a method similar to that of the first modification and the frame pattern 33 used to form the write shield layer portion 18A is removed. After that, first, as shown in FIGS. 30A and 30B, a seed layer 35 for performing a plating process is formed in a pattern in a region in which the write shield layer portion 18B is to be formed in a post process on the gap layer portion 17A and the write shield layer portion 18A. At the time of forming the seed layer 35, for example, in a manner similar to the case of forming the seed layer 15 in the foregoing embodiment, a precursor seed layer (not shown) for forming the seed layer 35 is formed on the whole face and is patterned by using the photolithography technique and the etching technique. At this time, for example, by partly connecting the seed layer 35 to the seed layer 15, current can be passed to the seed layer 35 via the seed layer 15. Subsequently, by patterning the photoresist film by using the photolithography technique, a frame pattern 34 is formed so as to cover the region other than the formation region of the write shield layer portion 18B. After that, by selectively growing a plating film by using the seed layer 35 together with the frame pattern 34, the write shield layer portion 18B is formed. After that, by removing the frame pattern 34, the write shield layer 18 including the write shield layer portions 18A and 18B is formed.

Also in the case of forming the write shield layer 18 by using any of the first to third modifications, effects similar to those of the foregoing embodiment can be obtained.

Figures 31A, 31B:
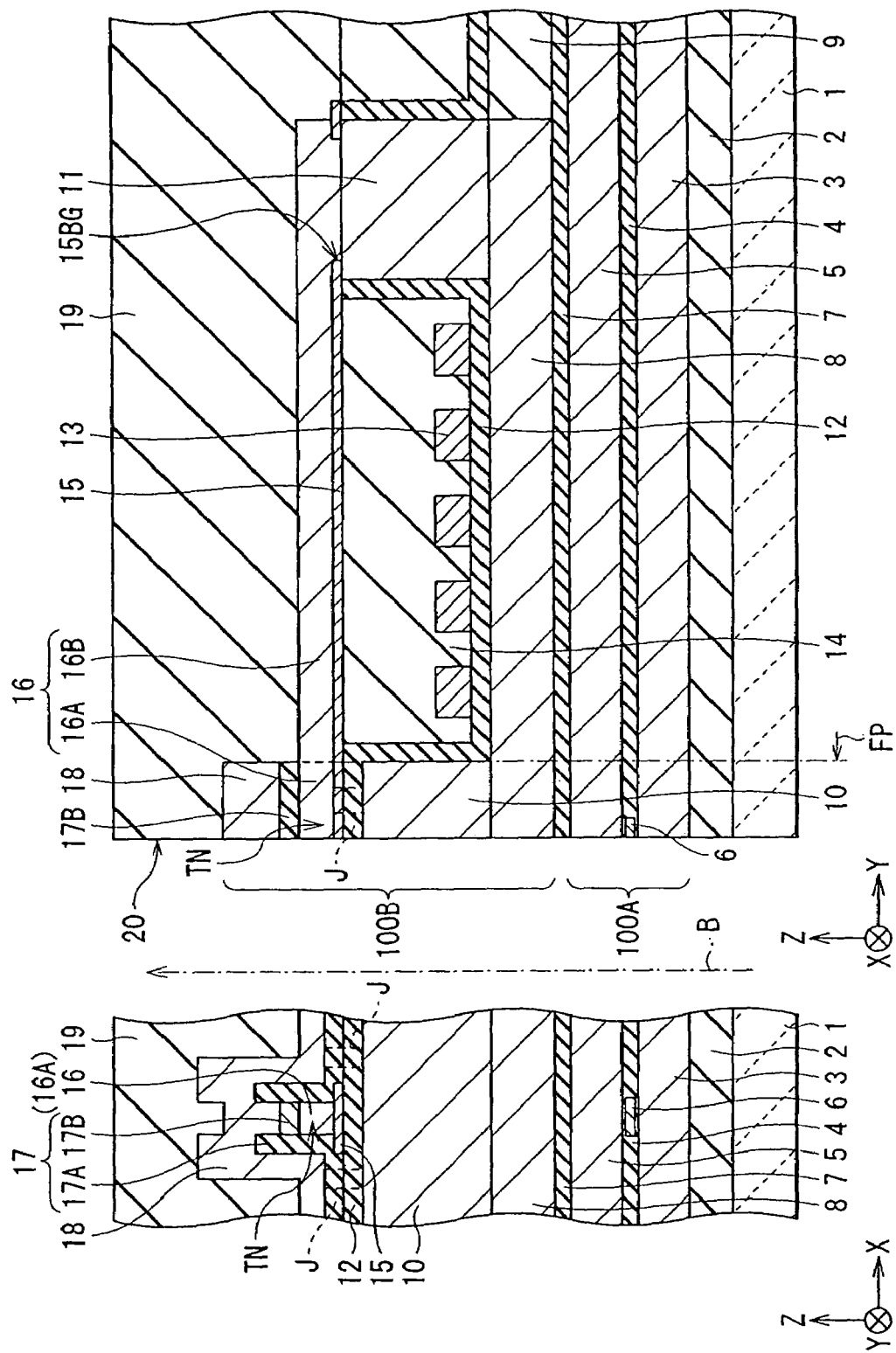
FIGS. 31A and 31B are cross sections showing a modification of the process of the thin film magnetic head illustrated in FIGS. 1A and 1B.

Although the gap layer portions 17A and 17B are adjacent to the whole magnetic pole layer 16 as shown in FIGS. 1A and 1B in the embodiment, the invention is not always limited to the configuration. For example, as shown in FIGS. 31A and 31B, the gap layer portions 17A and 17B may be adjacent only to the tip portion 16A of the magnetic pole layer 16. The method of manufacturing a thin film magnetic head having the configuration is substantially the same as that described in the foregoing embodiment except for the point that the gap layer portion 17A is formed so as to be adjacent only to the tip portion 16A in two side directions and the gap layer portion 17B is formed so as to be adjacent only to the tip portion 16A in the trailing direction. In this case, as the region surrounded by the gap layer portion 17A, in place of the magnetic pole formation region T for forming the magnetic pole layer 16 described in the foregoing embodiment, a magnetic pole tip formation region TN for forming the tip portion 16A is formed. In this case as well, effects similar to those of the foregoing embodiment can be obtained. In the case of manufacturing the thin film magnetic head having the configuration shown in FIGS. 31A and 31B, as the method of forming the write shield layer 18, the single process method described in the foregoing embodiment or the plural-process method described in the first to third modifications (FIGS. 25A and 25B to FIGS. 30A and 30B) may be used.

Although the invention has been described by the embodiment and modifications, the invention is not limited to the embodiments but may be variously modified. Concretely, for example, the case of applying the invention to a single magnetic pole type head has been described in the foregoing embodiment. The invention, however, is not always limited to the case but can be applied to a ring-type head. Although the case of applying the invention to a composite thin film magnetic head has been described in the foregoing embodiment, the invention is not always limited to the case but can be applied to, for example, a recording-only thin film magnetic head having an inductive magnetic transducer for writing and a thin film magnetic head having an inductive magnetic transducer for both recording and reproducing. Obviously, the invention can be also applied to a thin film magnetic head in which a device for writing and a device for reading are stacked in the order opposite to the above-described order.

Although the case of applying the invention to a thin film magnetic head of the perpendicular recording method has been described in the foregoing embodiment, the invention is not always limited to the head but can be also applied to a thin film magnetic head of the longitudinal recording method.

As described above, in the method of manufacturing a thin film magnetic head according to the first aspect of the invention, in a magnetic pole formation region surrounded by a first gap layer, a magnetic pole layer and a second gap layer are formed, and the magnetic pole layer is covered with the first and second gap layers from three directions. After that, a magnetic shield layer is formed on the first and second gap layer so as to surround the magnetic pole tip portion of the magnetic pole layer from three directions. Consequently, based on the characteristic manufacturing process, the thin film magnetic head in which the magnetic shield layer is disposed so as to surround the magnetic pole layer from three directions of the medium outflow direction and two side directions can be easily formed with high precision.

In the method of manufacturing a thin film magnetic head according to the second aspect of the invention, in a magnetic pole tip formation region surrounded by a first gap layer, a magnetic pole tip portion and a second gap layer are formed, and the magnetic pole tip portion is surrounded from three directions by the first and second gap layers. After that, a magnetic shield layer is formed on the first and second gap layer portions so as to surround the magnetic pole tip portion from three directions of the medium outflow direction and two side directions. Thus, the thin film magnetic head in which the magnetic shield layer is disposed so as to surround the magnetic pole tip portion from three directions of the medium outflow direction and two side directions can be easily formed with high precision.

The thin film magnetic head according to the first aspect of the invention has: the first gap layer adjacent to the magnetic pole layer in two side directions; the second gap layer disposed adjacent to the magnetic pole layer in the medium outflow direction; and the magnetic shield layer surrounding the magnetic pole tip portion of the magnetic pole layer from three directions of the medium outflow direction and the two side directions via the first and second gap layers. Thus, the thin film magnetic head can be manufactured by using the method of manufacturing a thin film magnetic head according to the first aspect of the invention.

The thin film magnetic head according to the second aspect of the invention has: the first gap layer adjacent to the magnetic pole tip portion in two side directions; the second gap layer adjacent to the magnetic pole tip portion in the medium outflow direction; and the magnetic shield layer surrounding the magnetic pole tip portion from three directions of the medium outflow direction and the two side directions via the first and second gap layers. Thus, the thin film magnetic head can be manufactured by using the method of manufacturing a thin film magnetic head according to the second aspect of the invention.

In addition to the above, in the method of manufacturing a thin film magnetic head of the invention, by forming the magnetic pole layer and the second gap layer by using a seed layer, the invention can contribute to facilitate manufacturing of the thin film magnetic head also from this viewpoint.

In the method of manufacturing a thin film magnetic head of the invention, when the outline of the seed layer is larger than that of the magnetic pole layer, the magnetic pole layer can be stably formed by using the seed layer.

In the method of manufacturing a thin film magnetic head according to the invention, a precursor photoresist layer is formed so as to include a portion having a width larger than the width of the magnetic pole tip portion and, after that, a second photoresist layer is formed by narrowing the width of the portion by ashing the precursor photoresist layer. Consequently, the second photoresist layer can be formed with high precision so as to have a very narrow width which cannot be realized by pattern precision of the photolithography technique and, accordingly, the magnetic pole tip portion of the magnetic pole layer can be also formed with high precision.

In the method of manufacturing a thin film magnetic head according to the invention, by emitting an ion beam from a direction forming an angle in a range from 65° to 70° with a direction orthogonal to a plane extended from the second photoresist layer at the time of using ion milling, the portion other than the portion to be etched in the first gap layer can be prevented from being unintentionally etched.

In the method of manufacturing a thin film magnetic head according to the invention, by setting the depth of the magnetic pole formation region to be larger than the thickness of the magnetic pole layer, an inconvenience that the magnetic pole layer and the magnetic shield layer are unintentionally connected to each other can be avoided.

Obviously many modifications and variations of the present invention are possible in the light of the above teachings. It is therefore to be understood that within the scope of the appended claims, the invention may be practiced otherwise than as specifically described.

What is claimed is:

1. A method of manufacturing a thin film magnetic head comprising a thin film coil for generating a magnetic flux and a magnetic pole layer having a magnetic pole tip portion for emitting the magnetic flux generated by the thin film coil toward a recording medium traveling in a predetermined medium travel direction, comprising:

a first step of forming a first photoresist layer in a pattern so as to have a shape in plan view corresponding to a shape in plan view of the magnetic pole layer;

a second step of forming a first gap layer so as to cover the first photoresist layer and a peripheral region of the first photoresist layer;

a third step of forming a second photoresist layer so as to cover the first gap layer;

a fourth step of exposing the first photoresist layer by etching at least the second photoresist layer and the first gap layer halfway;

a fifth step of removing the first and second photoresist layers to thereby form a magnetic pole formation region surrounded by the first gap layer in a region from which the first photoresist layer is removed;

a sixth step of forming the magnetic pole layer in a pattern in the magnetic pole formation region so as to extend from a recording medium facing surface which faces the recording medium in the direction away from the recording medium facing surface;

a seventh step of forming a second gap layer in a pattern on the magnetic pole layer to thereby surround the magnetic pole layer from three directions of a medium outflow direction in the medium travel direction and two side directions orthogonal to the medium outflow direction by the first and second gap layers; and an eighth step of forming a magnetic shield layer in a pattern on the first and second gap layers so as to extend from the recording medium facing surface in the direction away from the recording medium facing surface and to surround the magnetic pole tip portion of the magnetic pole layer from the three directions.

2. A method of manufacturing a thin film magnetic head according to claim 1, further comprising, before the first step, a ninth step of forming a seed layer for performing a plating process in a pattern, wherein the first photoresist layer is formed on the seed layer in the first step, the seed layer is exposed in the magnetic pole formation region in the fifth step, and the magnetic pole layer and the second gap layer are formed by growing a plating film by using the seed layer in the sixth and seventh steps.

3. A method of manufacturing a thin film magnetic head according to claim 2, wherein the ninth step includes the steps of:

forming a precursor seed layer; and etching and patterning the precursor seed layer, thereby forming the seed layer.

4. A method of manufacturing a thin film magnetic head according to claim 2, wherein outline of the seed layer is set to be larger than that of the magnetic pole layer.

5. A method of manufacturing a thin film magnetic head according to claim 1, wherein the first step includes the steps of:

forming a precursor photoresist layer so as to include a portion having a width larger than the width of the magnetic pole tip portion; and forming the first photoresist layer by narrowing the width of the portion having the width larger than the width of the magnetic pole tip portion by ashing the precursor photoresist layer.

6. A method of manufacturing a thin film magnetic head according to claim 1, wherein in the second step, the thickness of the first gap layer is set to 0.1 µm or less.

7. A method of manufacturing a thin film magnetic head according to claim 1, wherein in the fourth step, etching is performed while emitting an ion beam from a direction forming an angle in a range from 65° to 70° with a direction orthogonal to a plane extended from the second photoresist layer by using ion milling.

8. A method of manufacturing a thin film magnetic head according to claim 1, wherein in the fourth step, the first gap layer is etched so that the depth of the magnetic pole formation region formed in the fifth step becomes larger than the thickness of the magnetic pole layer.

9. A method of manufacturing a thin film magnetic head according to claim 2, wherein the eighth step includes the steps of:

forming a first magnetic shield layer portion as a part of the magnetic shield layer so as to extend from the recording medium facing surface in the direction away from the recording medium facing surface by growing a plating film by using the seed layer on the second gap layer in the magnetic pole formation region; and forming the magnetic shield layer including the first and second magnetic shield layer portions by forming a second magnetic shield layer portion as another part of the magnetic shield layer so as to extend from the recording medium facing surface in the direction away from the recording medium facing surface on the first gap layer and the first magnetic shield layer portion and so as to surround the magnetic pole tip portion from the three directions.

10. A method of manufacturing a thin film magnetic head according to claim 1, wherein the magnetic pole layer is allowed to emit a magnetic flux for magnetizing the recording medium in the direction orthogonal to the surface of the recording medium.

11. A method of manufacturing a thin film magnetic head comprising a thin film coil for generating a magnetic flux and a magnetic pole layer having a magnetic pole tip portion for emitting the magnetic flux generated by the thin film coil toward a recording medium traveling in a predetermined medium travel direction, comprising:

a first step of forming a first photoresist layer in a pattern so as to have a shape in plan view corresponding to a shape in plan view of the magnetic pole tip portion;

a second step of forming a first gap layer so as to cover the first photoresist layer and a peripheral region of the first photoresist layer;

a third step of forming a second photoresist layer so as to cover the first gap layer;

a fourth step of exposing the first photoresist layer by etching at least the second photoresist layer and the first gap layer halfway;

a fifth step of removing the first and second photoresist layers to thereby form a magnetic pole tip formation region surrounded by the first gap layer in a region from which the first photoresist layer is removed;

a sixth step of forming the magnetic pole tip portion in a pattern in the magnetic pole tip formation region so as to extend from a recording medium facing surface which faces the recording medium in the direction away from the recording medium facing surface;

a seventh step of forming a second gap layer in a pattern on the magnetic pole tip portion to thereby surround the magnetic pole tip portion from three directions of a medium outflow direction in the medium travel direction and two side directions orthogonal to the medium outflow direction by the first and second gap layers; and an eighth step of forming a magnetic shield layer in a pattern on the first and second gap layers so as to extend from the recording medium facing surface in the direction away from the recording medium facing surface and to surround the magnetic pole tip portion from the three directions.

* * * * *